US010575234B2

(12) United States Patent
Qiao et al.

(10) Patent No.: US 10,575,234 B2
(45) Date of Patent: Feb. 25, 2020

(54) WIRELESS DEVICE HANDOVER IN A WIRELESS NETWORK WITH BEARER CAPABILITIES

(71) Applicants: Weihua Qiao, Herndon, VA (US); Esmael Dinan, McLean, VA (US); Kyungmin Park, Herndon, VA (US); Peyman Talebi Fard, Sterling, VA (US)

(72) Inventors: Weihua Qiao, Herndon, VA (US); Esmael Dinan, McLean, VA (US); Kyungmin Park, Herndon, VA (US); Peyman Talebi Fard, Sterling, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 16/267,959

(22) Filed: Feb. 5, 2019

(65) Prior Publication Data

US 2019/0246328 A1    Aug. 8, 2019

Related U.S. Application Data

(60) Provisional application No. 62/626,184, filed on Feb. 5, 2018.

(51) Int. Cl.
*H04W 36/00*    (2009.01)
*H04W 36/30*    (2009.01)

(52) U.S. Cl.
CPC ....... *H04W 36/30* (2013.01); *H04W 36/0058* (2018.08); *H04W 36/00837* (2018.08)

(58) Field of Classification Search
CPC ............. H04W 36/30; H04W 36/0058; H04W 36/00837
USPC .................................. 455/436, 437; 370/338
See application file for complete search history.

(56) References Cited

U.S. PATENT DOCUMENTS

| 2013/0012211 | A1* | 1/2013 | Sander | H04W 36/0022 455/438 |
| 2016/0345230 | A1* | 11/2016 | Cuevas Ramirez | H04W 36/14 |
| 2017/0238215 | A1* | 8/2017 | Jin | H04W 8/08 370/331 |

OTHER PUBLICATIONS

3GPP TS 23.401 V15.0.0 (Jun. 2017) Technical Specification 3rd Generation Partnership Project; Technical Specification Group Services and System Aspects; General Packet Radio Service (GPRS) enhancements or Evolved Universal Terrestrial Radio Access Network (E-UTRAN) access (Release 15).

(Continued)

*Primary Examiner* — Marcos Batista
(74) *Attorney, Agent, or Firm* — David Grossman; Kavon Nasabzadeh; Philip Smith

(57) ABSTRACT

A first base station receives from at least one second base station, a first message comprising capability information indicating a number of bearers supported by the at least one second base station. The first base station receives from a wireless device, a measurement report comprising a received power of a cell of the second base station. The first base station determines a handover to the cell based on the measurement report and the number of bearers supported by the at least one second base station. The first base station sends a handover request to the at least one second base station in response to the determining of the handover.

20 Claims, 16 Drawing Sheets

(56) References Cited

OTHER PUBLICATIONS

3GPP TS 24.301 V14.4.0 (Jun. 2017) Technical Specification 3rd Generation Partnership Project; Technical Specification Group Core Network and Terminals; Non-Access-Stratum (NAS) protocol for Evolved Packet System (EPS); Stage 3 (Release 14).
3GPP TS 29.274 V15.0.0 (Jun. 2017) Technical Specification 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3(Release 15).
3GPP TS 36.300 V15.0.0 (Dec. 2017) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15).
SA WG2 Meeting #122bis S2-175383—Aug. 21-25, 2017, Sophia Antipolis, France (revision of S2-17xxxx) Source: Telstra Title: Discussion on LTE/EPS bearer limitations Document for: Discussion and agreement Agenda Item: 6.1 Work Item / Release: TIE15 / Rel-15.
SA WG2 Meeting #122bis S2-176693 Aug. 21-25, 2017, Sophia Antipolis, France (e-mail revision 1 of S2-176553) Title: LS on the number of bearers Release: Release 15.
SA WG Meeting #S2-124 S2-178231 Nov. 27-Dec. 1, 2017,Reno, Nevada, USA (revision of S2-177187)SA WG2 Meeting #S2-123 S2-177187 Oct. 23-27, 2017, Ljublana, Slovenia 3GPP TSG-RAN WG2 Meeting #99 bis R2-1712066 Prague, Czech Republic, Oct. 9-13, 2017 Title: Reply LS on the number of bearers Reply to: S2-176693 LS on the number of bearers Release: Release 15.
SA WG2 Meeting #S2-124 S2-178247 Nov. 27-Dec. 1, 2017, Reno, Nevada, USA 3GPP TSG-CT WG1 Meeting #106 C1-174658 Kochi (India), Oct. 23-27, 2017 Title: Reply LS on the number of bearers Release: Release 15.
SA WG2 Meeting #S2-124 S2-178259 Nov. 27-Dec. 1, 2017, Reno, Nevada, USA 3GPP TGS CT4 Meeting #80 C4-175345 Kochi, India; Oct. 23-27, 2017 Title: Reply LS on the number of bearers Response to: LS (S2-176693) on the number of bearers from SA2 Release: Rel-15.
SA WG2 Meeting #124 S2-178287 Nov. 27-Dec. 1, 2017, Reno, NV, USA (was S2-17-) Source: Samsung Title: Discussion paper: Extension of the maximum number of bearers in EPC Document for: Approval Agenda Item: Common issues and Incoming LSs (4.1) Work Item / Release: Rel-15.
SA WG2 Meeting #124 S2-179536 Nov. 27-Dec. 1, 2017, Reno, USA Title: Reply LS on the number of bearers Response to: Reply LS on the number of bearers (R2-1712066, C1-174658, C4-175345) Release: Rel-15 [TBC].
SA WG2 Meeting #125 S2-180137 Jan. 22-26, 2018, Gothenburg, Sweden Source: vivo Title: EBI allocation in the NW supporting INOBEAR. Document for: Approval Agenda Item: 6.15 Work Item / Release: INOBEAR /Rel-15.
3GPP TSG SA WG2 Meeting #125 S2-180251 Jan. 22-26, 2018, Gothenburg, Sweden Source: Telstra Title: Key decisions for INOBEAR Document for: Discussion Agenda Item: 6.7 Work Item / Release: INOBEAR / Rel-15.
SA WG2 Meeting #125 S2-180506 Jan. 22-26, 2018, Gothenburg, Sweden (revision of S2-18xxxx) Source: T-Mobile USA INC Title: Discussion on Dealing with reduction in bearers at mobility Document for: Discussion Agenda item: 6.15 Work Item / Release: INOBEAR / Release 16.
3GPP TSG SA Meeting #78; SP-171044; Dec. 20-22, 2017, Lisbon, Portugal; SA WG2 meeting #S2-124; S2-179647; Nov. 27-Dec. 1, 2017, Reno, Nevada, USA; Source: SA WG2; Title: New WID on increasing the maximum number of LTE bearers; Document for: Approval; Agenda Item: 18; Title: Increasing the number of ESP bearers.
3GPP TSG SA Meeting #80; SP-180495; Jun. 13-15, 2018, La Jolla, California, USA; Title: 4CRs to 23.401 (Rel-15: INOBEAR); Source: SA WG2; Work Item: INOBEAR; Agenda Item: 15B.10.
3gpp ts 36.413 v15.0.0 (Dec. 2017); 3rd Generation Partnership Project; Technical Specification Group Radio Access Network; Evolved Universal Terrestrial Radio Access Network (E-UTRAN); S1 Application Protocol (S1AP) (Release 15).

* cited by examiner

| IE/Group Name | Presence | Range | IE Type and Reference |
|---|---|---|---|
| CHOICE Cause Group | M | | |
| >Radio Network Layer | | | |
| >>Radio Network Layer Cause | M | | ENUMERATED (Unspecified, TX2RELOCOverall Expiry, Successful Handover, Release due to E-UTRAN Generated Reason, Handover Cancelled, Partial Handover, Handover Failure In Target EPC/eNB Or Target System, Handover Target not allowed, Radio resources not available, Failure in the Radio Interface Procedure, Invalid QoS combination, Inter-RAT redirection, ..., Not supported QCI value, invalid CSG Id, Release due to Pre-Emption, Exceeding supported number of bearers) |

FIG. 9

| IE/Group Name | Presence | Range | IE type and reference | Semantics description |
|---|---|---|---|---|
| Message Type | M | | 9.2.1.1 | |
| eNB Name | O | | PrintableString(SIZE(1.. 150,....)) | |
| Supported TAs | | 0..<maxnoofTACs> | | Supported TAs in the eNB. |
| >TAC | M | | 9.2.3.7 | Broadcast TAC. |
| >Broadcast PLMNs | | 1..<maxnoofBPLMNs> | | Broadcast PLMNs. |
| >>PLMN Identity | M | | 9.2.3.8 | |
| >RAT-Type | O | | 9.2.1.117 | RAT Type associated with the TAC of the indicated PLMN(s). |
| CSG Id List | | 0..1 | | |
| >CSG Id | | 1..<maxnoofCSGId> | 9.2.1.62 | |
| Default Paging DRX | O | | 9.2.1.16 | |
| NB-IoT Default Paging DRX | O | | 9.2.1.114 | |
| eNB Bearer Capability | | 0..1 | | |
| >Number of Bearer Supported | | | | Maximal number of bearer supported by eNB |

FIG. 10

| Information elements | P | Condition / Comment | IE Type | Ins. |
|---|---|---|---|---|
| Recovery | M | | Recovery | 0 |
| Sending Node Features | C O | This IE shall be sent towards a peer node on any GTPv2 interface if the sending node supports at least one feature on this interface or if the sending node supports at least one feature and does not know the interface type towards the peer node. This IE may be present otherwise. | Node Features | 0 |
| Private Extension | O | | Private Extension | VS |

FIG. 11A

| Octets | 8 | 7 | 6 | 5 | 4 | 3 | 2 | 1 |
|---|---|---|---|---|---|---|---|---|
| 1 | Type = 152 (decimal) ||||||||
| 2 to 3 | Length = n ||||||||
| 4 | Spare |||| Instance ||||
| 5 | Supported-Features ||||||||
| 6 to (n+4) | These octet(s) is/are present only if explicitly specified ||||||||

FIG. 11B

| Feature Octet / Bit | Feature | Interface | Description |
|---|---|---|---|
| 5/1 | PRN | S11, S4 | PGW Restart Notification. |
| 5/2 | MABR | S11 | Modify Access Bearers Request. |
| 5/3 | NTSR | S11/S4 | Network Triggered Service Restoration procedure. |
| 5/4 | CIOT | S11/S4 | Cellular Internet Of Things. |
| 5/5 | BEARER CAPABILITY | S11/S4/S5/S8 | Indicating capability of network element (e.g. MME, SGW, PGW, SGW/PGW) for total supported number of bearers (e.g. 15 bearers) |

FIG. 12

Receive, by a 1st base station from a 2nd base station(s), a 1st message comprising capability information indicating a number of bearers supported by the 2nd base station(s)
1310

Receive, by a 1st base station from a wireless device, a measurement report comprising a received power of a cell of the 2nd base station
1320

Determine, by the 1st base station, a handover to the cell based on the measurement report and the number of bearers supported by the 2nd base station(s)
1330

Send, by the 1st base station to the 2nd base station(s), a handover request in response to the determining the handover
1340

FIG. 13

Receive, by a base station from a MME, a 1st message requesting creating a new bearer, the 1st message comprising an EPS bearer identity
1610

Determine, by the base station, based on capability of supported number of bearers of the base station whether to accept or reject the request
1620

Send, by the base station to the MME, a 2nd message in response to the 1st message, the 2nd message comprising information element(s) indicating that the creating the new bearer failed because of exceeding supported number of bearerse
1630

FIG. 16

WIRELESS DEVICE HANDOVER IN A WIRELESS NETWORK WITH BEARER CAPABILITIES

CROSS-REFERENCE TO RELATED APPLICATIONS

This application claims the benefit of U.S. Provisional Application No. 62/626,184, filed Feb. 5, 2018, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 9 is an example diagram depicting an information element of cause applied over an interface between an eNodeB and an MME as per an aspect of an embodiment of the present disclosure.

FIG. 10 is an example diagram depicting the list of information elements in an ENB CONFIGURATION UPDATE message comprising an information element eNodeB bearer capability indicating number of bearer supported as per an aspect of an embodiment of the present disclosure.

FIG. 11A is an example diagram depicting the list of information elements in an echo request message as per an aspect of an embodiment of the present disclosure.

FIG. 11B is an example diagram depicting the information element definition of sending node feature comprised in an echo request message as per an aspect of an embodiment of the present disclosure.

FIG. 12 is an example diagram depicting the example supported-features values comprised in a sending node feature information element, and a value of BEARER CAPABILITY used to indicate the capability of a network element as per an aspect of an embodiment of the present disclosure.

FIG. 13 is an example flow diagram of an aspect of an embodiment of the present disclosure.

FIG. 16 is an example flow diagram of an aspect of an embodiment of the present disclosure.

DETAILED DESCRIPTION OF EXAMPLES

Example embodiments of the present disclosure enable implementation of enhanced features and functionalities in 4G systems. More particularly, the embodiments of the technology disclosed herein may relate to different capabilities of network elements for supporting number of bearers. Throughout the present disclosure, UE, wireless device, and mobile device are used interchangeably. Throughout the present disclosure, base station, evolved Node B (eNB or eNodeB) are used interchangeably.

Figure 1:
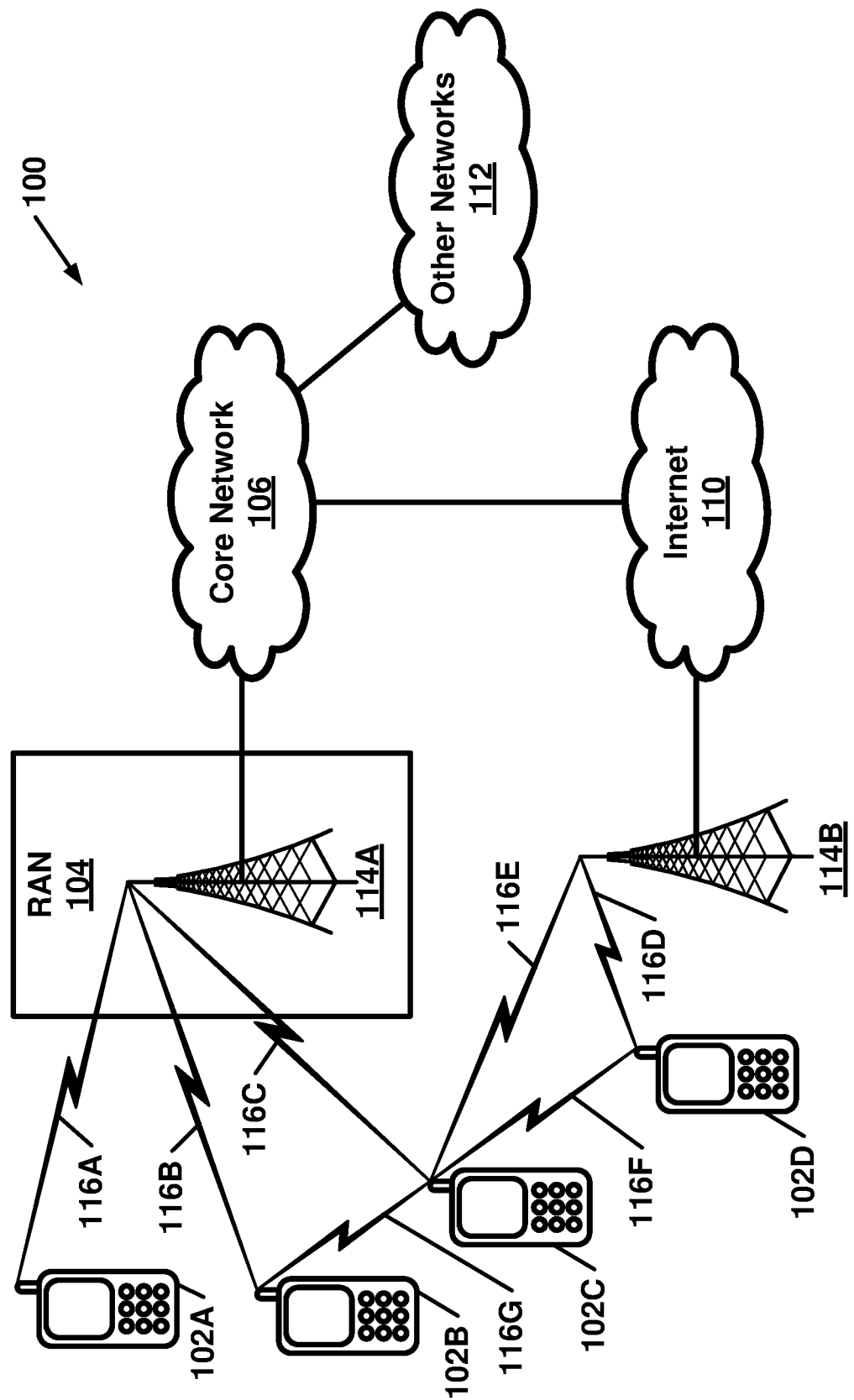
FIG. 1 is a system diagram of an example communications system as per an aspect of an embodiment of the present disclosure.

The following acronyms are used throughout the present disclosure:
  4G 4th generation mobile networks
  AF Application Function
  AMBR Aggregate Maximum Bit Rate
  AN Access Network
  APN Access Point Name
  BBERF Bearer Binding and Event Reporting Function
  DPI Deep Packet Inspection
  DL Downlink
  eNB evolved Node B
  eNodeB evolved Node B
  EPS Evolved Packet System
  E-UTRAN Evolved Universal Terrestrial Radio Access Network
  GW Gateway
  HSS Home Subscriber Server
  IoT Internet of things
  LBI Linked EPS Bearer Identity
  LGW Local Gateway
  MEC Mobile Edge Computing
  MME Mobility Management Entity
  NAS Non-Access-Stratum
  OCS Online Charging System
  OFCS Offline Charging System
  PCC Policy and Charging Control
  PCEF Policy and Charging Enforcement Function
  PCRF Policy and Charging Rules Function
  PDN Packet Data Network
  PGW PDN Gateway
  PLMN Public Land Mobile Network
  PMIP Proxy Mobile IP
  PTI Procedure Transaction Id
  RAN Radio Access Network
  SGW Serving Gateway
  SIPTO Selected IP Traffic Offload
  TDF Traffic Detection Function
  UE User Equipment
  UL Uplink FIG. 1 is a diagram of an example communications system 100 in which one or more disclosed embodiments may be implemented. The communications system 100 may comprise a multiple access system configured to provide content, such as voice, data, video, messaging, broadcast, etc., to multiple wireless users. The communications system 100 may enable multiple wireless users to access such content through the sharing of system resources, including, for example, wireless bandwidth. For example, communications systems 100 may employ one or more channel access processes, such as code division multiple access (CDMA), time division multiple access (TDMA), frequency division multiple access (FDMA), orthogonal FDMA (OFDMA), single-carrier FDMA (SC-FDMA), and/or the like.

As shown in FIG. 1, the communications system 100 may comprise wireless transmit/receive units (WTRUs) 102A, 102B, 102C, 102D, a radio access network (RAN) 104, a core network 106, the Internet 110, and/or other networks 112. It will be appreciated that the disclosed embodiments contemplate various numbers of WTRUs, base stations, networks, and/or network elements. Each of the WTRUs 102A, 102B, 102C, 102D may be configured to operate and/or communicate in a wireless environment. By way of example, WTRUs 102A, 102B, 102C, 102D may be configured to transmit and/or receive wireless signals and may comprise user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, combinations thereof, and/or the like.

The communications systems 100 may also comprise a base station 114A and/or base station 114B. Each of the base stations 114A, 114B may be a type of device configured to wirelessly interface with at least one of the WTRUs 102A, 102B, 102C, 102D to facilitate access to one or more communication networks, such as core network 106, Internet 110 and/or networks 112. By way of example, base stations 114A and/or 114B may comprise a base transceiver station (BTS), a Node-B, an eNode B, a Home Node B, a Home eNode B, a site controller, an access point (AP), a wireless router, combinations thereof, and/or the like. While base stations 114A and 114B are each depicted as a single element, it will be appreciated that base stations 114A and 114B may comprise various numbers of interconnected base stations and/or network elements.

As illustrated, base station 114A may be a part of the RAN 104, which may also comprise other base stations and/or network elements (not shown), such as, for example, a base station controller (BSC), a radio network controller (RNC), relay nodes, combinations thereof, and/or the like. Base station 114A and/or the base station 114B may be configured to transmit and/or receive wireless signals within a particular geographic region, which may be referred to as a cell (not shown). The cell may be further divided into cell sectors. For example, the cell associated with the base station 114A may be divided into three sectors. Thus, according to an embodiment, base station 114A may comprise three transceivers, i.e., one for each sector of the cell. According to an embodiment, base station 114A may employ multiple-input multiple output (MIMO) technology and, therefore, may utilize multiple transceivers for each sector of the cell.

Base stations 114A and/or 114B may communicate with one or more of the WTRUs (e.g. 102A, 102B, 102C, and 102D) over an air interface (e.g. 116A, 116B, (116C and/or 116E), and 116D, respectively), which may comprise a wireless communication link (e.g., radio frequency (RF), microwave, infrared (IR), ultraviolet (UV), visible light, etc.). An air interface (e.g. 116A, 116B, 116C, 116D, 116E, 116F and 116G) may be established employing a suitable radio access technology (RAT).

More specifically, as noted above, communications system 100 may comprise a multiple access system and may employ one or more channel access schemes, such as CDMA, TDMA, FDMA, OFDMA, SC-FDMA, combinations thereof, and/or the like. For example, base station 114A in the RAN 104 and WTRUs 102A, 102B, and 102C may implement a radio technology such as Universal Mobile Telecommunications System (UMTS) Terrestrial Radio Access (UTRA), which may establish air interface (e.g. 102A, 102B, and 102C) employing wideband CDMA (WCDMA). WCDMA may comprise communication protocols such as High-Speed Packet Access (HSPA) and/or Evolved HSPA (HSPA+). HSPA may comprise High-Speed Downlink Packet Access (HSDPA) and/or High-Speed Uplink Packet Access (HSUPA).

According to an embodiment, base station 114A and WTRUs 102A, 102B, 102C may implement a radio technology such as Evolved UMTS Terrestrial Radio Access (E-UTRA), which may establish air interface (e.g. 116A, 116B, and 116C, respectively) employing Long Term Evolution (LTE) and/or LTE-Advanced (LTE-A).

According to an embodiment, base station 114A and WTRUs 102A, 102B, 102C may implement radio technologies such as IEEE 802.16 (i.e., Worldwide Interoperability for Microwave Access (WiMAX)), CDMA1000, CDMA1000 1X , CDMA1000 EV-DO, Interim Standard 1000 (IS-1000), Interim Standard 95 (IS-95), Interim Standard 856 (IS-856), Global System for Mobile communications (GSM), Enhanced Data rates for GSM Evolution (EDGE), GSM EDGE (GERAN), combinations thereof, and/or the like.

Base station 114B in FIG. 1 may comprise a wireless router, Home Node B, Home eNode B, or an access point, for example, and may utilize a RAT for facilitating wireless connectivity in a localized area, such as a place of business, a home, a vehicle, a campus, combinations thereof, and/or the like. According to an embodiment, base station 114B and WTRUs 102C, 102D may implement a radio technology such as IEEE 802.11 to establish a wireless local area network (WLAN). According to an embodiment, base station 114B and WTRUs 102C and 102D may implement a radio technology such as IEEE 802.15 to establish a wireless personal area network (WPAN). According to an embodiment, base station 114B and WTRUs 102C and 102D may utilize a cellular-based RAT (e.g., WCDMA, CDMA1000, GSM, LTE, LTE-A, etc.) to establish a picocell or femtocell. As shown in FIG. 1, base station 114B may have a direct connection to the Internet 110. Thus, base station 114B may not be required to access the Internet 110 via the core network 106.

The RAN 104 may be in communication with the core network 106, which may be a type of network configured to provide voice, data, applications, and/or voice over internet protocol (VoIP) services to one or more of the WTRUs 102A, 102B, 102C, and 102D. For example, core network 106 may provide call control, billing services, mobile location-based services, pre-paid calling, Internet connectivity, video distribution, etc., and/or perform high-level security functions, such as user authentication. Although not shown in FIG. 1, it anticipated that according to an embodiment, RAN 104 and/or core network 106 may be in direct or indirect communication with other RANs that employ the same RAT as the RAN 104 or a different RAT. For example, in addition to being connected to the RAN 104, which may utilize an E-UTRA radio technology, the core network 106 may also be in communication with another RAN (not shown).

Core network 106 may serve as a gateway for the WTRUs 102A, 102B, 102C and/or 102D to access the Internet 110 and/or other networks 112. The Internet 110 may comprise a global system of interconnected computer networks and devices that use common communication protocols, such as the transmission control protocol (TCP), user datagram protocol (UDP) and the internet protocol (IP) in the TCP/IP internet protocol suite. Other networks 112 may comprise wired and/or wireless communications networks owned and/or operated by other service providers. For example, the networks 112 may comprise another core network connected to one or more RANs, which may employ the same RAT as the RAN 104 or a different RAT.

Some or all of the WTRUs 102A, 102B, 102C, and 102D in the communications system 100 may comprise multi-mode capabilities (i.e., the WTRUs 102A, 102B, 102C, and 102D may comprise multiple transceivers for communicating with different wireless networks over different wireless links).

Figure 2:
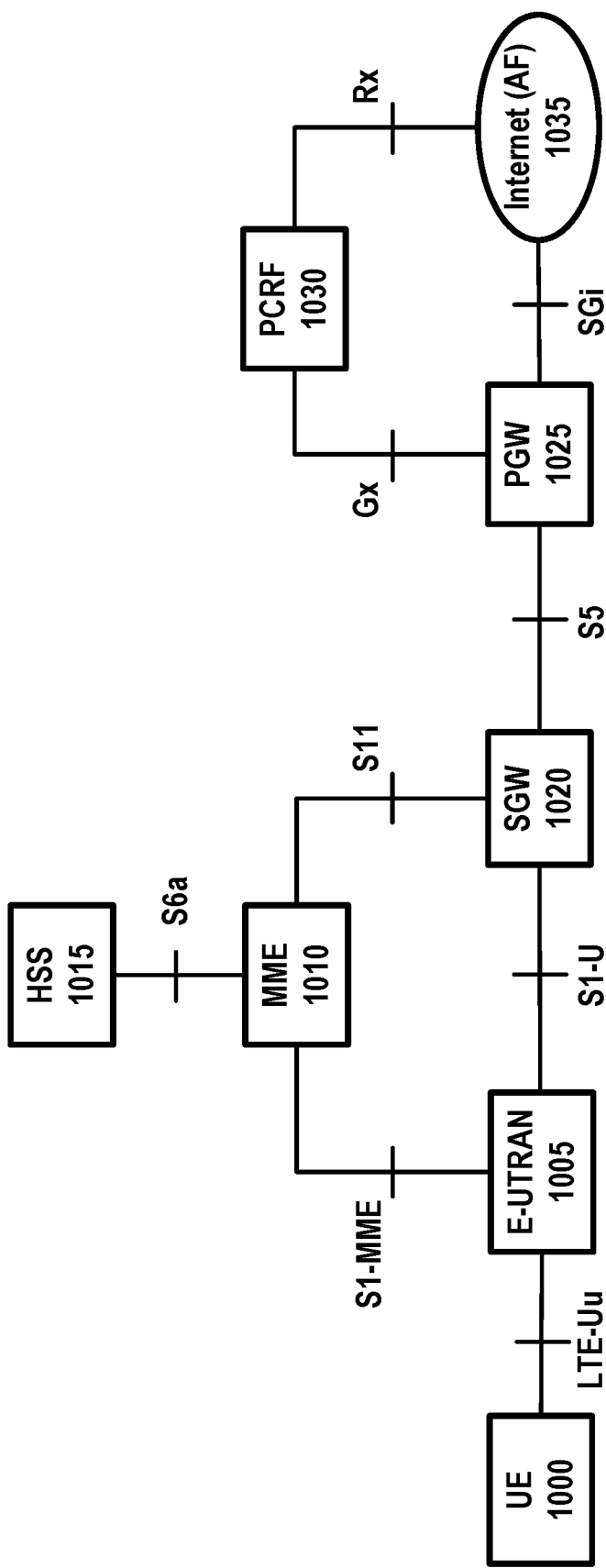
FIG. 2 is an example diagram of non-roaming 4G architecture for 3GPP accesses as per an aspect of an embodiment of the present disclosure.

FIG. 2 is an example diagram of non-roaming 4G architecture for 3GPP accesses.

E-UTRAN 1005 may be an access network, and may have the function of Header compression and user plane ciphering, UL and DL bearer level admission control, UE-AMBR enforcement, etc.

MME 1010 may have the function of NAS signaling, mobility management, session management, PDN GW and Serving GW selection, etc.

HSS 1015 may be a database that contains user-related and subscriber-related information. It may provide supporting functions in mobility management, call and session setup, user authentication and access authorization.

SGW 1020 may be a gateway which terminates the user plane interface towards the E-UTRAN. It may be the functionality of mobility anchoring for inter-3GPP mobility, and may have the function of packet routing and forwarding, and accounting for inter-operator charging, etc.

PGW 1025 may be a gateway which terminates the SGi interface towards the PDN. It may comprise the function of per-user based packet filtering (by e.g. deep packet inspection), UE IP address allocation, and policy enforcement (e.g. QoS policy and charging policy enforcement).

PCRF 1030 may be the policy and charging control element. It may make the QoS policy, charging policy and gating policy and send the policies to the PCEF (PGW) 1025 for enforcement.

AF 1035 may be the application function, and it may provide the application related information to the PCRF 1030 for policy decision.

Figure 3:
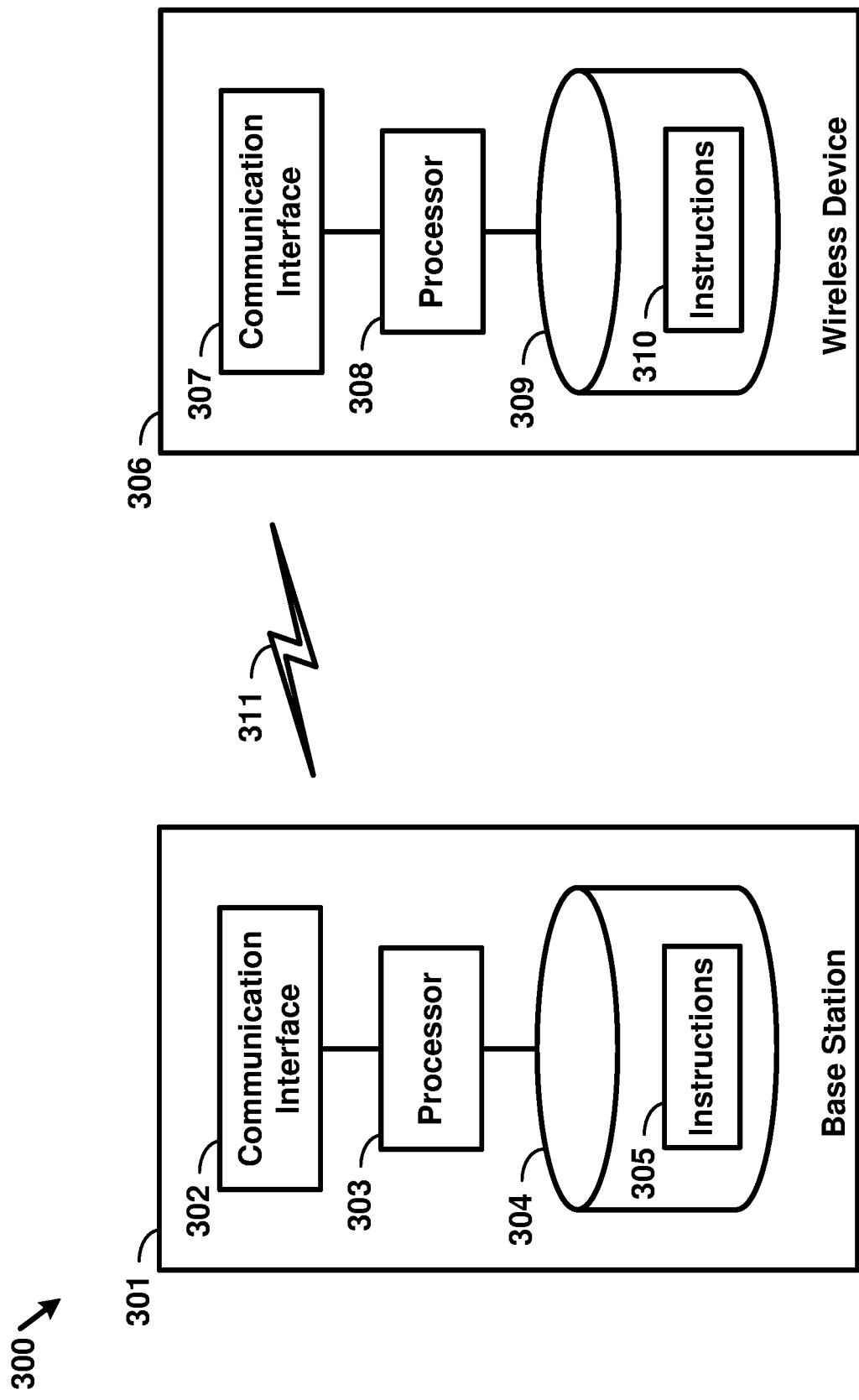
FIG. 3 is a block diagram of a base station and a wireless device as per an aspect of an embodiment of the present disclosure.

FIG. 3 is an example block diagram of a base station 301 and a wireless device 306, as per an aspect of an embodiment of the present invention. A communication network 500 may comprise at least one base station 301 and at least one wireless device 306. The base station 301 may comprise at least one communication interface 302, at least one processor 303, and at least one set of program code instructions 305 stored in non-transitory memory 304 and executable by the at least one processor 303. The wireless device 306 may comprise at least one communication interface 307, at least one processor 308, and at least one set of program code instructions 310 stored in non-transitory memory 309 and executable by the at least one processor 308. Communication interface 302 in base station 301 may be configured to engage in communication with communication interface 307 in wireless device 306 via a communication path that comprises at least one wireless link 311. Wireless link 311 may be a bi-directional link. Communication interface 307 in wireless device 306 may also be configured to engage in a communication with communication interface 302 in base station 301. Base station 301 and wireless device 306 may be configured to send and receive data over wireless link 311 using multiple frequency carriers. According to some of the various aspects of embodiments, transceiver(s) may be employed. A transceiver is a device that comprises both a transmitter and receiver. Transceivers may be employed in devices such as wireless devices, base stations, relay nodes, and/or the like.

Figure 4:
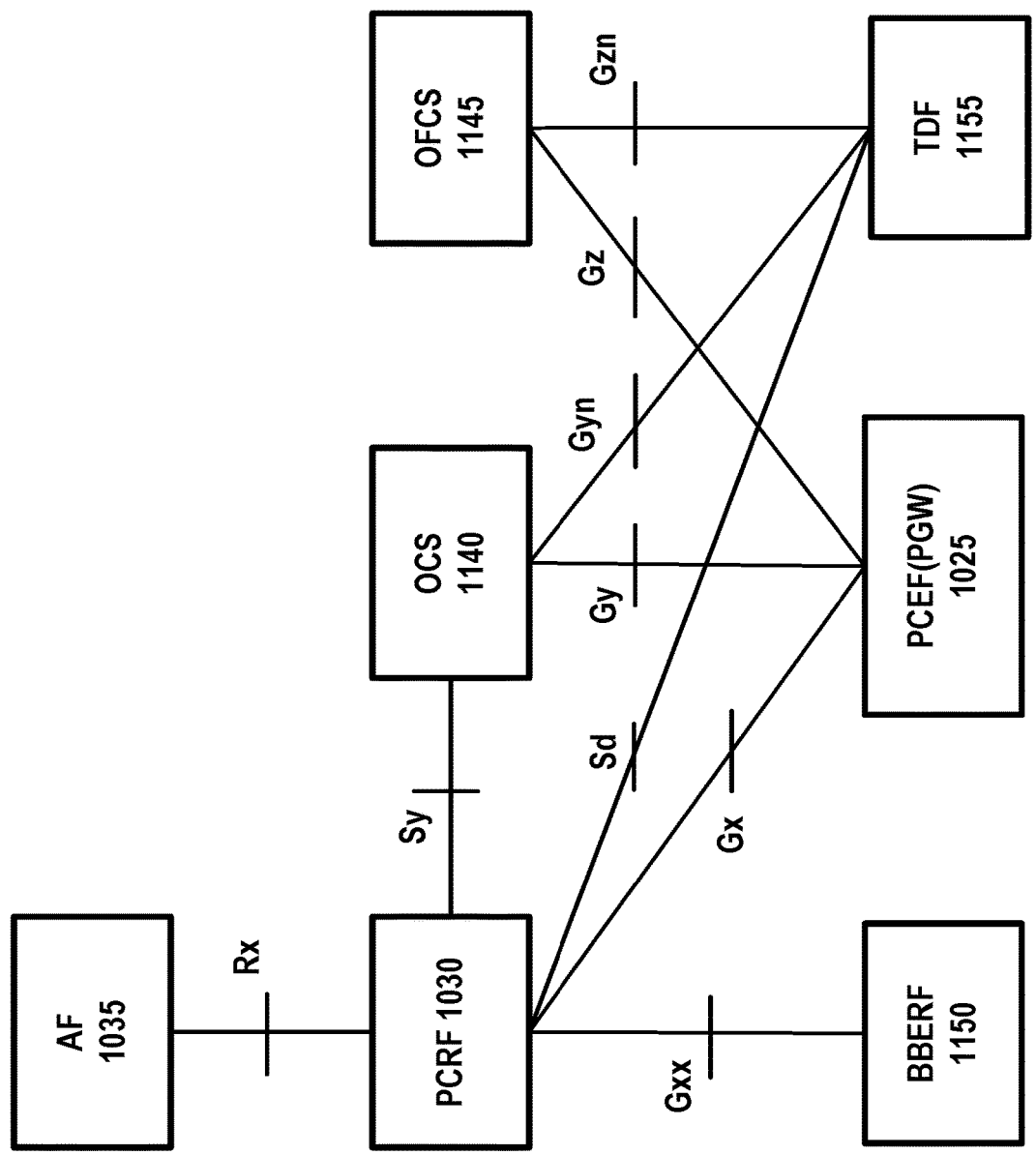
FIG. 4 is an example diagram of policy and charging control architecture as per an aspect of an embodiment of the present disclosure.

FIG. 4 is an example diagram of policy and charging control architecture.

PCEF 1025 may be located in a PGW, and it mainly enforces the policy (e.g. QoS policy, charging policy and gating) received from the PCRF 1030. BBERF 1150 may be located in an SGW or non-3GPP access, and it may be used for PMIP-based S5/S8 or non-3GPP access scenario and enforce the QoS policy received from a PCRF. TDF 1155 may be the traffic detection function and may be used for the application detection with the DPI function. OCS 1140 may be the online charging system and may interact with the PGW 1025 or TDF 1155 to provide the online charging function. OFCS 1145 may be the offline charging system and may interact with the PGW 1025 or TDF 1155 to provide the offline charging function.

Implementation of existing technologies may have issues in which different network elements may have capabilities that support different numbers of bearers. Existing technologies may have issues indicating the cause of a failure when creating a bearer. Example embodiments may indicate a failure for creating a bearer when the cause(s) of the failure are due to: (1) exceeding the supported number of bearers, and/or (2) an EPS bearer QoS cannot be supported. Embodiments may use the cause information to avoid further signaling to create a bearer.

Implementation of existing technologies may have issues indicating a capability to support various numbers of bearers. The capability may be reported using session level and/or bearer level signaling. Example embodiments may indicate a capability of a network element to support a number of bearers by node level signaling.

Implementation of existing technologies have no ability to select an eNodeB for an eNodeB handover based on bearer capabilities. Example embodiments may select an eNodeB for an eNodeB handover based on capability(ies) of supported number of bearers for candidate target eNodeB(s). The embodiments may be used to select an eNodeB that avoids communication interruption during a handover.

Implementation of existing technologies may not have the ability to select an MME for MME relocation based on bearer capabilities. Example embodiments may select an MME for MME relocation based on capability(ies) of supported number of bearers for candidate target MME.

Implementation of existing technologies not have the ability to select an SGW for SGW relocation. Example embodiments may select an SGW for SGW relocation based on capability(ies) of supported number of bearers for candidate target SGW.

Figure 5:
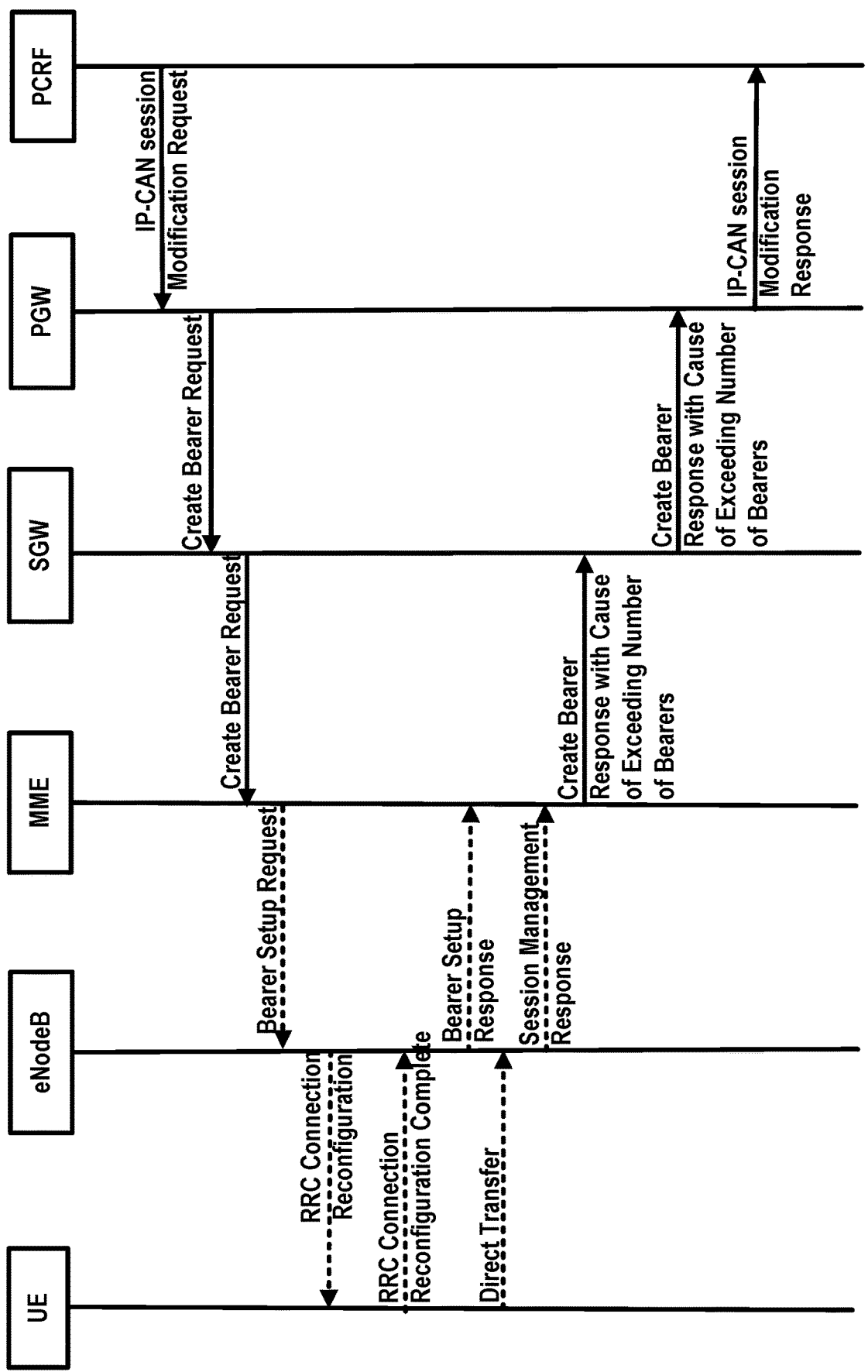
FIG. 5 is an example call flow diagrams depicting dedicated bearer activation procedure as per an aspect of an embodiment of the present disclosure.

In an example, a PGW may initiate a dedicated bearer creation procedure, an MME may have limited capability to support a new bearer and/or, the MME may have limited capability to support requested QoS. The MME may indicate a failure to create a bearer with the cause(s) of exceeding supported number of bearers and/or EPS bearer QoS cannot be supported. FIG. 5 shows an example call flow which may comprise one or more actions.

A PCRF may send to a PGW a PCC decision provision (QoS policy) message. This may correspond to an initial step of the PCRF-Initiated IP-CAN Session Modification procedure or to the PCRF response in the PCEF initiated IP-CAN Session Modification procedure. In response to the message received from the PCRF, the PGW may determine to create a new dedicated bearer, and the PGW may use the received QoS policy to assign the EPS bearer QoS for a bearer, e.g., it may assign the values to a bearer level QoS parameters QCI, ARP, GBR and MBR. The PGW may send to an SGW a create bearer request message comprising one or more of the following parameters applied to a bearer: IMSI, Procedure Transaction Id (PTI), EPS bearer QoS, TFT, S5/S8 TEID, charging id, Linked EPS Bearer Identity (LBI), and/or protocol configuration options; wherein the LBI may be the EPS Bearer Identity of the default bearer; the PTI parameter may be used when the procedure was initiated by a UE requested bearer resource modification procedure; the protocol configuration options may be used to transfer application level parameters between the UE and the PGW, and may be sent transparently through an MME and an SGW.

Figure 8:
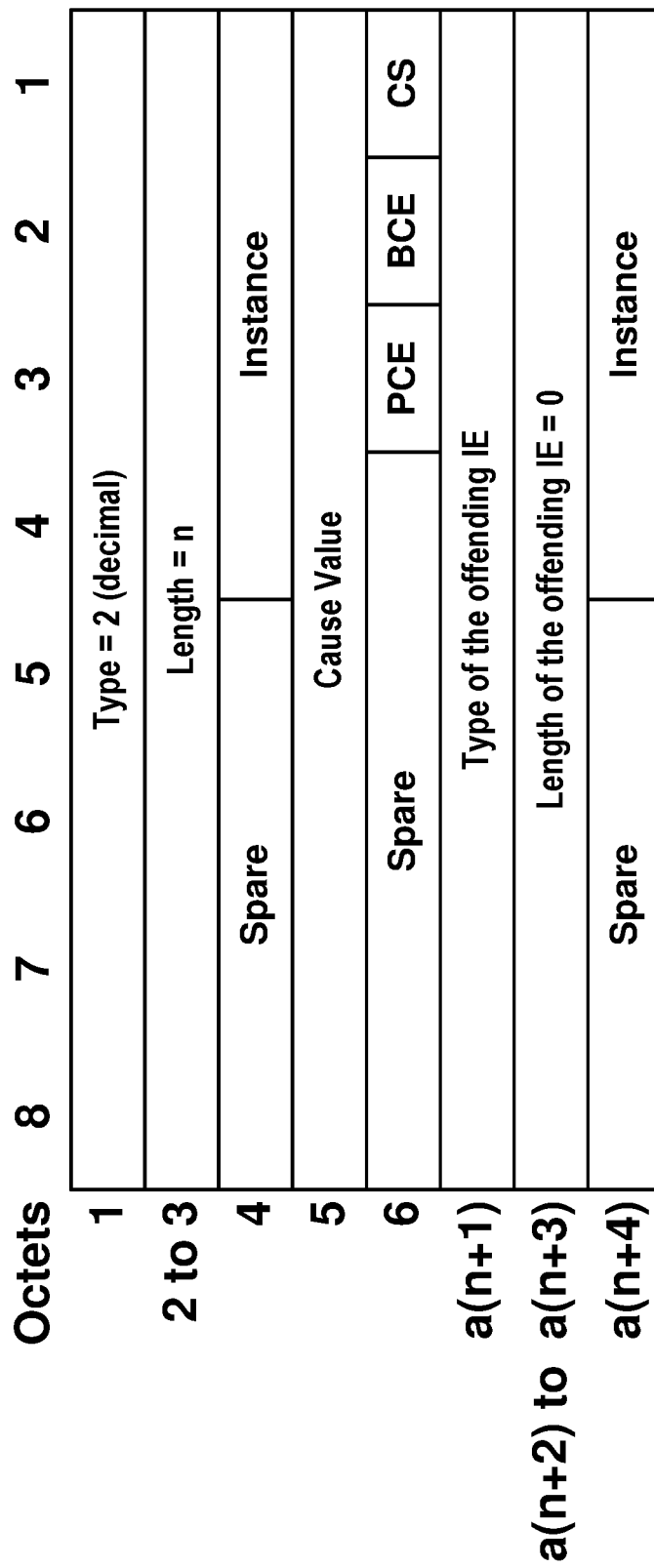
FIG. 8 is an example diagram depicting an information element of cause applied over an interface between a PGW and an SGW, and/or an interface between an SGW and an MME as per an aspect of an embodiment of the present disclosure.

In response to the message received from the PGW, the SGW may determine whether it can support creating a new bearer and/or whether it can support the EPS bearer QoS. As an example, the SGW may determine whether it can support creating a new bearer by checking whether number of bearers has exceeded a configured supported number of bearers if a new bearer is created. In an example, if the SGW determines it cannot to create a new bearer, e.g. the number of bearers has exceeded the configured supported number of bearers and/or the EPS bearer QoS cannot be supported, the SGW may send to PGW a response message (e.g. create bearer response) comprising at least one cause information element indicating failure of creating a bearer because of exceeding supported number of bearers and/or EPS bearer QoS cannot be supported; FIG. 8 is an example diagram depicting an information element of cause comprised in the create bearer response message. As an example, the create bearer response message may comprise one cause information element indicating failure of creating a bearer because of exceeding supported number of bearers and/or EPS bearer QoS cannot be supported; as an example, the create bearer response message may comprise two cause information elements (IE), a first IE may be used to indicate the failure of creating a bearer because of exceeding supported number of bearers, and a second IE may be used to indicate the failure of creating a bearer because of EPS bearer QoS cannot be supported by the SGW. The PGW may response to the PCRF that the PCC rule cannot be enforced, and the following actions in this example are not performed in this case. In an example, if the SGW determines it can create a new bearer, or the SGW does not determine whether it can create a new bearer at this moment, the SGW may send to an MME a create bearer request message comprising one or more of the following parameters applied to a bearer: IMSI, PTI, EPS bearer QoS, TFT, S1-TEID, PDN GW TEID (GTP-based S5/S8), LBI, and/or protocol configuration options.

In response to the message received from the SGW, the MME may determine whether it can support creating a new bearer and/or whether it can support the EPS bearer QoS. As an example, the MME may determine whether it can support creating a new bearer by checking whether number of bearers has exceeded a configured supported number of bearers if a new bearer is created. In an example, if the MME determines it cannot create a new bearer, e.g. the number of bearers has exceeded the configured supported number of bearers and/or the EPS bearer QoS cannot be supported, the MME may send to the SGW, a response message (e.g. create bearer response) comprising at least one cause information element indicating failure of creating a bearer because of exceeding supported number of bearers and/or EPS bearer QoS cannot be supported. FIG. 8 is an example diagram depicting an information element of cause comprised in the create bearer response message. As an example, the create bearer response message may comprise one cause information element indicating failure of creating a bearer because of exceeding supported number of bearers and/or EPS bearer QoS cannot be supported; as an example, the create bearer response message may comprise two cause information elements (IE), a first IE may be used to indicate the failure of creating a bearer because of exceeding supported number of bearers, and a second IE may be used to indicate the failure of creating a bearer because of EPS bearer QoS cannot be supported by the MME. The SGW may send to PGW a response message (e.g. create bearer response) comprising at least one cause information element indicating the failure of creating a bearer because of exceeding supported number of bearers of MME and/or EPS bearer QoS cannot be supported by the MME; and the PGW may response to the PCRF that the PCC rule cannot be enforced, the following actions in this example are not performed in this case. In an example, if the MME determines it can create a new bearer, or the MME does not determine whether it can create a new bearer at this moment, the MME may select an EPS bearer identity, which has not yet been assigned to the UE, and the MME may build a session management request message comprising one or more of the following parameters: PTI, TFT, EPS bearer QoS parameters (excluding ARP), Protocol configuration options, the EPS bearer identity, and/or the Linked EPS Bearer Identity (LBI), and the MME may send to an eNodeB a bearer setup request message comprising one or more of the following: EPS bearer identity, EPS bearer QoS, session management request message, S1-TEID.

In response to the message received from the MME, the eNodeB may determine whether it can support creating a new bearer and/or whether it can support the EPS bearer QoS. As an example, the eNodeB may determine whether it can support creating a new bearer by checking whether number of bearers has exceeded the configured supported number of bearers if a new bearer is created. In an example, if the eNodeB determines it cannot create a new bearer, e.g. number of bearers has exceeded the configured supported number of bearers and/or the EPS bearer QoS cannot be supported, the eNodeB may send to the MME, a response message (e.g. bearer setup response) comprising at least one cause information element indicating failure of creating a bearer because of exceeding supported number of bearers and/or EPS bearer QoS cannot be supported; FIG. 9 is an example diagram depicting an information element of cause comprised in the bearer setup response message sending from the eNodeB to the MME. As an example, the bearer setup response message may comprise one cause information element indicating the failure of creating a bearer because of exceeding supported number of bearers and/or Not supported QCI value; as an example, the bearer setup response message may comprise two cause information elements (IE), a first IE may be used to indicate the failure of creating a bearer because of exceeding supported number of bearers, and a second IE may be used to indicate the failure of creating a bearer because of Not supported QCI value. In response to the message received from the eNodeB, the MME may send to SGW, a response message (e.g. create bearer response) comprising at least one cause information element indicating the failure of creating a bearer because of exceeding supported number of bearers of eNodeB and/or EPS bearer QoS cannot be supported by the eNodeB; The SGW may send to PGW a response message (e.g. create bearer response) comprising at least one cause information element indicating failure of creating a bearer because of exceeding supported number of bearers of eNodeB and/or EPS bearer QoS cannot be supported by the eNodeB; and the PGW may response to the PCRF that the PCC rule cannot be enforced, the following actions in this example are not performed in this case. In an example, if the eNodeB determines it can create a new bearer, or the eNodeB does not determine whether it can create a new bearer at this moment, the eNodeB may map the EPS bearer QoS to Radio Bearer QoS and may send to a UE a RRC connection reconfiguration message comprising one or more of the following information applied to a bearer: Radio Bearer QoS, session management request, and/or EPS RB Identity.

In response to the message received from the eNodeB, the UE may send to the eNodeB an RRC connection reconfiguration complete message. If the UE determines it may not create a new bearer, e.g. the number of bearers has exceeded the configured total supported number of bearers and/or the Radio Bearer QoS may not be supported, the RRC connection reconfiguration complete message may comprise at least one cause information element indicating failure of creating a bearer because of exceeding total supported number of bearers and/or Radio Bearer QoS cannot be supported.

In response to the message received from the UE, the eNodeB may send to the MME a bearer setup response message comprising one or more of the following: EPS Bearer Identity, and/or S1-TEID. The message may indicate failure of creating a bearer by comprising at least one cause information element with one or more values. In an example, a first cause value may be used to indicate the UE rejects a new bearer because of exceeding supported number of bearers and/or Radio Bearer QoS may not be supported. In an example, a second cause value may be used to indicate the eNodeB rejects a new bearer because of exceeding total supported number of bearers and/or EPS bearer QoS cannot be supported. The MME may receive this message after the session management response message (sent in following action). If the UE determines it may create a new bearer, the UE NAS layer may build a session management response message comprising the EPS Bearer Identity, and the UE may send to the eNodeB a direct transfer message comprising the session management response message.

In response to the message received from the UE, the eNodeB may send to the MME an uplink NAS transport (session management response) message. In response to the message received from the eNodeB, the MME may determine whether it can support creating a new bearer and/or whether it can support the EPS bearer QoS. The MME may send to the SGW a create bearer response message comprising one or more of the following: EPS Bearer Identity, S1-TEID, and/or User Location Information (ECGI). The create bearer response message may indicate failure of creating a bearer by comprising at least one cause information element with one or more values. In an example, a first cause value may be used to indicate the UE rejects a new bearer because of exceeding supported number of bearers and/or Radio Bearer QoS cannot be supported. In an example, a second cause value may be used to indicate the eNodeB rejects a new bearer because of exceeding supported number of bearers and/or EPS bearer QoS cannot be supported. In an example, a third cause value may be used to indicate the MME rejects a new bearer because of exceeding supported number of bearers and/or EPS bearer QoS cannot be supported. As an example, FIG. 8 depicts a cause information element comprised in the create bearer response message.

In response to the message received from the MME, the SGW may determine whether it can support creating a new bearer and/or whether it can support the EPS bearer QoS. The SGW may acknowledge the bearer activation to the PGW by sending a create bearer response comprising one or more of the following: EPS Bearer Identity, S5/S8-TEID, and/or User Location Information (ECGI). The message may indicate failure of creating a bearer by comprising at least one cause information element with one or more values. In an example, a first cause value may be used to indicate the UE rejects a new bearer because of exceeding supported number of bearers and/or Radio Bearer QoS cannot be supported. In an example, a second cause value may be used to indicate the eNodeB rejects a new bearer because of exceeding supported number of bearers and/or EPS bearer QoS cannot be supported. In an example, a third cause value may be used to indicate the MME rejects a new bearer because of exceeding supported number of bearers and/or EPS bearer QoS cannot be supported. In an example, a fourth cause value may be used to indicate the SGW rejects a new bearer because of exceeding supported number of bearers and/or EPS bearer QoS cannot be supported. As an example, FIG. 8 depicts a cause information element comprised in the create bearer response message.

In response to the message received from the SGW, the PGW may send to the PCRF a response message indicating whether the requested PCC decision (QoS policy) could be enforced or not, allowing the completion of the PCRF-Initiated IP-CAN Session Modification procedure or the PCEF initiated IP-CAN Session Modification procedure. The message may indicate failure of creating a bearer by comprising at least one cause information element with one or more values. In an example, a first cause value may be used to indicate the UE rejects a new bearer because of exceeding supported number of bearers and/or Radio Bearer QoS may not be supported. In an example, a second cause value may be used to indicate the eNodeB rejects a new bearer because of exceeding supported number of bearers and/or EPS bearer QoS cannot be supported. In an example, a third cause value may be used to indicate the MME rejects a new bearer because of exceeding supported number of bearers and/or EPS bearer QoS cannot be supported. In an example, a fourth cause value may be used to indicate the SGW rejects a new bearer because of exceeding supported number of bearers and/or EPS bearer QoS cannot be supported. In an example, a fifth cause value may be used to indicate the PGW rejects a new bearer because of exceeding supported number of bearers and/or EPS bearer QoS cannot be supported.

The PCRF may take action(s) and/or make policy decision(s) based on the information received from the PGW. As an example, the PCRF may send to the PGW a message to remove some (e.g. low priority) PCC rules, the PGW may remove the related bearer accordingly. As an example, the PCRF may send to an AF a message comprising an information element indicating failure of creating a bearer for the service of AF.

Figure 6:
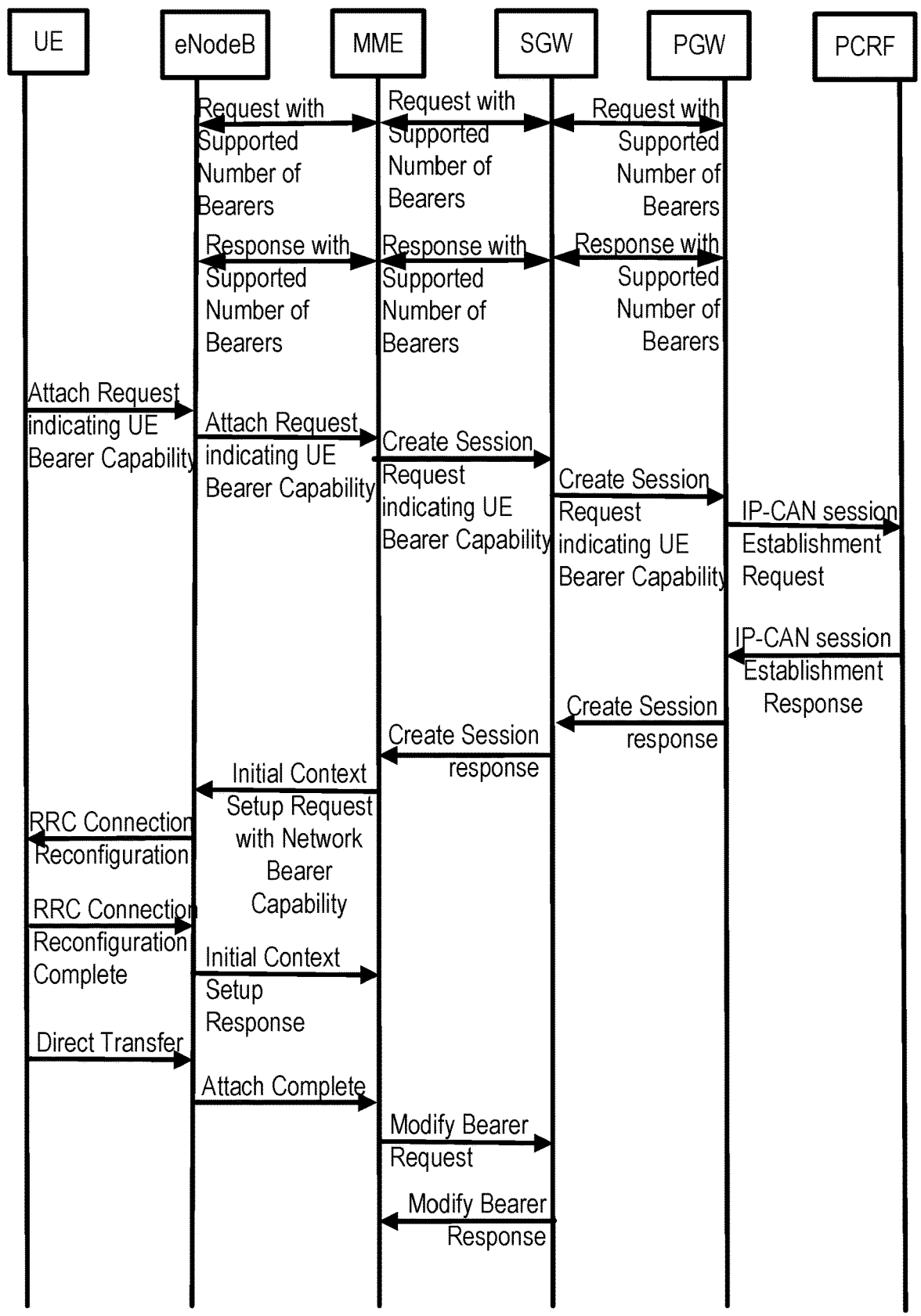
FIG. 6 is an example diagram of a procedure for getting/deriving network capability of supported number of bearers, and an initial attach procedure as per an aspect of an embodiment of the present disclosure.

In an example, an MME may derive/get network capability of supported number of bearers by node level signaling with eNodeB and SGW, and the MME may send to a UE the network capability of supported number of bearers when UE attached to the network. FIG. 6 shows an example call flow which may comprise one or more of the following actions:

An MME may receive from an eNodeB, a node level message comprising an information element indicating eNodeB capability of supported number of bearers as per eNodeB. As an example, the MME may receive from the eNodeB an ENB CONFIGURATION UPDATE message comprising an information element indicating eNodeB capability of supported total number of bearers. FIG. 10 is an example diagram depicting a list of information elements in an ENB CONFIGURATION UPDATE message comprising an information element eNodeB Bearer Capability indicating Number of Bearer Supported. In response to the message received from the eNodeB, the MME may send to the eNodeB a response message (e.g. ENB CONFIGURATION UPDATE ACKNOWLEDGE) comprising an information element indicating MME capability of supported number of bearers. As an example, the MME may send to the eNodeB a node level message (e.g. MME CONFIGURATION UPDATE) indicating MME capability of supported number of bearers. In response to the message received from the MME, the eNodeB may send to the MME a response message (e.g. MME CONFIGURATION UPDATE ACKNOWLEDGE) comprising an information element indicating eNodeB capability of supported number of bearers.

An SGW may receive from a PGW, a node level message comprising an information element indicating PGW capability of supported number of bearers as per PGW. As an example, the PGW may send to the SGW an Echo Request message, comprising BEARER CAPABILITY of supporting 15 bearers. FIG. 11A is an example diagram depicting a list of information elements in an Echo Request message; FIG. 11B is an example diagram depicting the information element definition of Sending Node Feature comprised in the Echo Request message; FIG. 12 is an example diagram depicting the example Supported-Features values comprised in the Sending Node Feature information element, and a value of BEARER CAPABILITY may be used to indicate capability of network element (e.g. MME, SGW, PGW) for total supported number of bearers (e.g. 15 bearers). In response to the message received, the SGW may reply to the PGW a node level message comprising an information element indicating SGW capability of supported number of bearers. As an example, the SGW may send to the PGW an Echo Response message, comprising BEARER CAPABILITY of supporting 11 bearers. As an example, the SGW may send to the PGW a node level message (e.g. Echo Request) indicating SGW capability of supported number of bearers; and the PGW may reply to SGW a node level message (e.g. Echo Response) indicating PGW capability of supported number of bearers.

The SGW may determine SGW&PGW capability of supported number of bearers, based on at least one or more of the following capabilities: SGW capability of supported number of bearers, and PGW capability of supported number of bearers. As an example, the SGW may compare the SGW capability of supported number of bearers with the PGW capability of supported number of bearers and may take the lower supported number of bearer as the SGW&PGW capability of supported number of bearers. For example, PGW capability of supported number of bearers is 15, SGW capability of supported number of bearers is 11, the SGW may determine that the SGW&PGW capability of supported number of bearers is 11.

An MME may receive from an SGW, a node level message comprising at least one information element indicating one or more of the following capabilities: SGW capability of supported number of bearers, PGW capability of supported number of bearers; and/or SGW&PGW capability of supported number of bearers. As an example, the MME may receive from the SGW an Echo Request message, comprising BEARER CAPABILITY of SGW supporting 11 bearers, BEARER CAPABILITY of PGW supporting 15 bearers, and/or BEARER CAPABILITY of SGW&PGW supporting 11 bearers. In response to the message received, the MME may reply to the SGW a node level message comprising an information element indicating MME capability of supported number of bearers. As an example, the MME may send to the SGW an Echo Response message, comprising BEARER CAPABILITY of supporting 15 bearers.

The MME may determine network capability of supported number of bearers per UE and/or per IP-CAN session and/or per APN, based on at least one or more of the following capabilities: eNodeB capability of supported number of bearers, MME capability of supported number of bearers, SGW capability of supported number of bearers, PGW capability of supported number of bearers, and/or SGW&PGW capability of supported number of bearers. As an example, the MME may compare the eNodeB capability of supported number of bearers, MME capability of supported number of bearers, SGW capability of supported number of bearers, PGW capability of supported number of bearers, and/or SGW&PGW capability of supported number of bearers. In an example, the MME and may take the lower supported number of bearer as the network capability of supported number of bearers. For example, eNodeB capability of supported number of bearers is 15, MME capability of supported number of bearers is 11, SGW capability of supported number of bearers is 11, PGW capability of supported number of bearers is 15, SGW&PGW capability of supported number of bearers may be 15, the MME may determine that the network capability of supported number of bearers is 11. The MME may send to the SGW a node level message (e.g. Echo Request) comprising the network capability of supported number of bearers, and in response to the message received from the MME, the SGW may send to the PGW a node level message (e.g. Echo Request) comprising the network capability of supported number of bearers.

A UE may initiate an attach procedure by sending to the eNodeB an attach request message comprising one or more of the following parameters: IMSI or old GUTI, Old GUTI type, last visited TAI (if available), UE core network capability, attach type, ESM message container, additional GUTI, P-TMSI signature, and/or MS network capability. The message may be together with RRC parameters indicating the Selected Network and the old GUMMEI. The attach request message may comprise a UE capability of supported number of bearers, as an example, the UE capability of supported number of bearers may be 15. In response to the message received from the UE, the eNodeB may forward to the MME the received attach request message comprising the UE capability of supported number of bearers.

In response to the message received from the eNodeB, the MME may take one or more of actions. In an example action, the MME may compare the UE capability of supported number of bearers with the network capability of supported number of bearers; As an example, the PGW may compare the UE capability of supported number of bearers with the network capability of supported number of bearers, and take the lower supported number of bearer as UE & network capability or system capability of supported number of bearers per UE and/or per IP-CAN session and/or per APN. For example, the UE capability of supported number of bearers is 15 and the network capability of supported number of bearers is 11, the PGW may determine the UE & network capability or system capability of supported number of bearers per UE and/or per APN and/or per IP-CAN session as 11. In an example action, the MME may allocate a Bearer Id. In an example action, the MME may selec a gateway (e.g. SGW), and send to the SGW a message, e.g. a create session request message comprising one or more of the following parameters: IMSI, MME TEID for control plane, RAT type, PGW address, PDN Address, default EPS bearer QoS, PDN type, subscribed APN-AMBR, APN, EPS bearer Id, and/or protocol configuration options. As an example, the message may comprise the UE capability of supported number of bearers if the UE capability of supported number of bearers is different with the network capability of supported number of bearers. As an example, the message may comprise the UE capability of supported number of bearers whatever the UE capability of supported number of bearers is different with the network capability of supported number of bearers or not. As an example, the message may comprise the UE & network capability or system capability of supported number of bearers.

In response to the message received from the MME, the SGW may create a new entry in its EPS Bearer table and store the information received from the MME (e.g. UE capability of supported number of bearers), and may send to a PGW a create session request message comprising one or more of the following parameters: IMSI, Serving GW address for the user plane, Serving GW TEID of the user plane, Serving GW TEID of the control plane, RAT type, default EPS bearer QoS, PDN Type, PDN address, subscribed APN-AMBR, APN and/or bearer Id. The message may comprise the UE capability of supported number of bearers if received from the MME. As an example, the message may comprise the UE & network capability or system capability of supported number of bearers.

In response to the message received from the SGW, the PGW may create a new entry in its EPS bearer context table, store the information received from the SGW (e.g. UE capability of supported number of bearers), and generates a Charging Id for the default bearer. The new entry allows the PGW to route user plane PDUs between the S-GW and the packet data network. As an example, the PGW may create bearer(s) based on UE & network capability or system capability of supported number of bearers if received from the SGW. As an example, the PGW may create bearer(s) based on one or more of the following capabilities: the UE capability of supported number of bearers, and the network capability of supported number of bearers. As an example, the PGW may compare the UE capability of supported number of bearers with the network capability of supported number of bearers and take the lower supported number of bearer as UE & network capability or system capability of supported number of bearers per UE and/or per IP-CAN session and/or per APN. For example, the UE capability of supported number of bearers is 15 and the network capability of supported number of bearers is 11, the PGW may determine the UE & network capability or system capability of supported number of bearers per UE and/or per APN and/or per IP-CAN session as 11. The PGW may create a bearer (e.g. creating a dedicated bearer) based on the UE & network capability or system capability of supported number of bearers, e.g. not exceed the UE & network capability or system capability of supported number of bearers when creating a new bearer. The PGW may send to a PCRF a message (e.g. IP-CAN session establishment request) to get the policy (s) for an IP-CAN session.

In response to the message received from the PGW, the PCRF may send to the PGW a message (e.g. IP-CAN session establishment response) by providing the policy (s) applied to service data flow(s) and/or the IP-CAN session. In response to the message received from the SGW, the PGW may return to the SGW a create session response message comprising one or more of the following parameters: PGW address for the user plane, PGW TEID of the user plane, PGW TEID of the control plane, PDN Type, PDN Address, EPS bearer Id, EPS bearer QoS, charging Id, and/or APN-AMBR). The PGW may correlate the PGW Address for the user plane and PGW TEID of the user plane, with the Serving GW Address for the user plane and Serving GW TEID of the user plane received from SGW. The correlated information may be used as the user plane tunnel address between the SGW and the PGW.

In response to the message received from the PGW, the SGW may correlate the Serving GW Address for the user plane and Serving GW TEID of the user plane, with the PGW address for the user plane and PGW TEID of the user plane received from the PGW. In response to the message received from the MME, the SGW may response to the MME a create session response message comprising at least one of: PDN Type, PDN address, SGW address for User Plane, SGW TEID for User Plane, SGW TEID for control plane, EPS bearer Id, EPS bearer QoS, PGW address and TEID (GTP-based S5/S8) at the PGW for uplink traffic and/or APN-AMBR. The MME may send to the eNodeB an attach accept message comprising one or more of the following parameters: GUTI, TAI List, and/or session management request message, where the session management request message may comprise one or more of the following parameters: APN, PDN type, PDN address, EPS bearer Identity, protocol configuration options, header compression configuration. The attach accept message may be contained in an S1_MME control message initial context setup request. The S1-AP initial context setup request message may also comprise the EPS bearer QoS, the UE-AMBR, EPS bearer Identity, as well as the TEID at the Serving GW used for user plane and the address of the Serving GW for user plane. The attach accept message may comprise the network capability of supported number of bearers. As an example, the message may comprise the network capability of supported number of bearers if the UE capability of supported number of bearers is different with the network capability of supported number of bearers. As an example, the message may comprise the network capability of supported number of bearers whatever the UE capability of supported number of bearers is different with the network capability of supported number of bearers or not.

In response to the message received from the MME, the eNodeB may take one or more of actions. In an example action, the eNodeB may store the information received from the MME. The eNodeB may use the SGW address for User Plane, SGW TEID for User Plane for the uplink data forwarding. In an example action, the eNodeB may send to the UE a RRC connection reconfiguration comprising EPS radio bearer identity and/or the network capability of supported number of bearers. The UE may create bearer(s) (e.g. UE requested PDN connectivity, UE requested bearer resource modification) based on one or more of the following capabilities: the UE capability of supported number of bearers, and the network capability of supported number of bearers. As an example, the UE may compare the UE capability of supported number of bearers with the network capability of supported number of bearers and take the lower supported number of bearer as UE & network capability or system capability of supported number of bearers per UE and/or per IP-CAN session and/or per APN. For example, the UE capability of supported number of bearers is 15 and the network capability of supported number of bearers is 11, the UE may determine UE & network capability or system capability of supported number of bearers per UE and/or per APN and/or per IP-CAN session as 11. The UE may create a bearer (e.g. UE requested PDN connectivity) based on the UE & network capability or system capability of supported number of bearers, e.g. not exceed the UE & network capability or system capability of supported number of bearers when creating a new bearer.

In response to the message received from the eNodeB, the UE may response to the eNodeB an RRC connection reconfiguration complete message. In response to the message received from the UE, the eNodeB may send to the MME an initial context response message. The initial context response message may comprise the TEID of the eNodeB and the address of the eNodeB used for downlink traffic on the S1_U reference point. The eNodeB may correlate the TEID of the eNodeB and the address of the eNodeB, with the SGW address for User Plane and the SGW TEID for User Plane received from the MME. The correlated information may be used as the user plane tunnel address between the eNodeB and the SGW.

The UE may send to the eNodeB a direct transfer message, the message may comprise an attach complete message which may comprise one or more of the following parameters: EPS Bearer Identity, NAS sequence number, and/or NAS-MAC. In response to the message received from the UE, the eNodeB may forward to the MME the attach complete message in an uplink NAS transport message. In response to the message received from the eNodeB, the MME may send to SGW a modify bearer request message comprising at least one of: EPS bearer Identity, eNodeB address, eNodeB TEID, handover indication, and/or presence reporting area information. The SGW may correlate the TEID of the eNodeB and the address of the eNodeB, with the SGW address for user plane and the SGW TEID for user plane. In response to the message received from the MME, the SGW may send to the MME a modify bearer response message comprising the EPS bearer Identity. The SGW may send its buffered downlink packets to the eNodeB.

Figure 7:
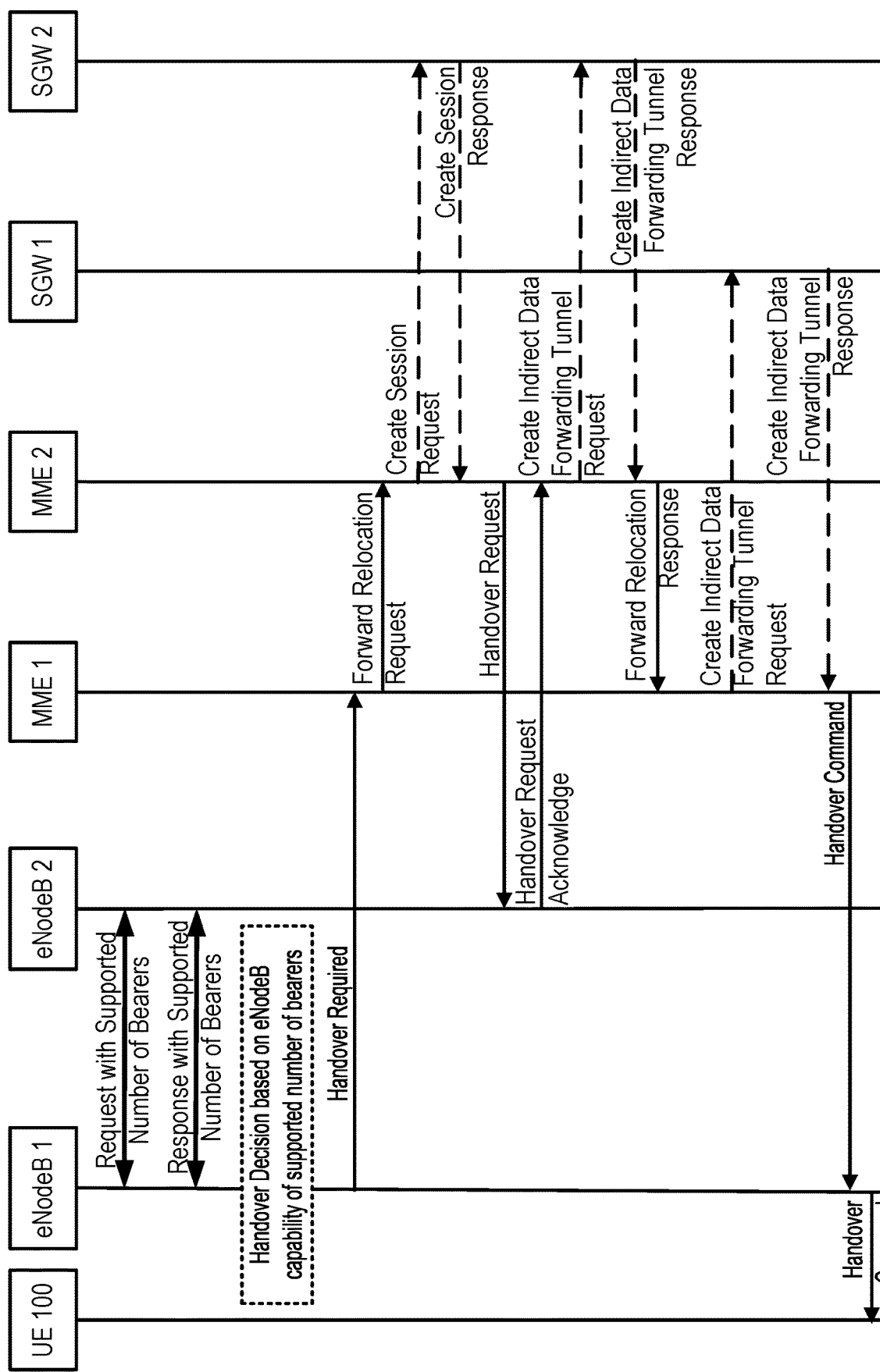
FIG. 7 is an example diagram depicting an eNodeB handover procedure as per an aspect of an embodiment of the present disclosure.

In an example, by node level signaling with one or more target eNodeBs, a source eNodeB may derive/get the target eNodeB(s) capability of supported number of bearers. The source eNodeB may select a target eNodeB for handover based on the target eNodeB capability of supported number of bearers. FIG. 7 shows an example call flow which may comprise one or more actions.

A first eNodeB 1 may receive from one or more second eNodeBs, a message (e.g. node level message as per eNodeB, or session level message as per IP-CAN session, or UE level message as per UE, APN level message as per APN) comprising an information element indicating second eNodeB capability of supported number of bearers. As an example, the eNodeB 1 may receive from an eNodeB 2 an ENB CONFIGURATION UPDATE message comprising an information element indicating eNodeB 2 capability of supported number of bearers. In response to the message received from the second eNodeB(s), the first eNodeB 1 may send to the second eNodeB(s) a response message. As an example, the eNodeB 1 may response to eNodeB 2 with an ENB CONFIGURATION UPDATE ACKNOWLEDGE message comprising an information element indicating eNodeB 1 capability of supported number of bearers.

As an example, the first eNodeB may send to one or more second eNodeBs a message (e.g. ENB CONFIGURATION UPDATE) comprising an information element indicating first eNodeB capability of supported number of bearers. In response to the message received from the first eNodeB, the second eNodeB(s) may send to the first eNodeB a response message (e.g. ENB CONFIGURATION UPDATE ACKNOWLEDGE) comprising an information element indicating second eNodeB capability of supported number of bearers. As an example, a first MME 1 may receive from one or more second MMEs a message comprising an information element indicating second MME capability of supported number of bearers. As an example, the first MME 1 may send to one or more second MMEs a message comprising an information element indicating first MME 1 capability of supported number of bearers. As an example, a second MME 2 may receive from one or more second SGWs a message comprising an information element indicating second SGW capability of supported number of bearers. As an example, the second MME 2 may send to one or more second SGWs a message comprising an information element indicating second MME 2 capability of supported number of bearers.

The first eNodeB 1 may receive from a UE a measurement report message comprising block error rate, transmit power and other UE-based parameters. The first eNodeB 1 may decide to initiate an S1-based handover to a second eNodeB. The first eNodeB 1 may select a second eNodeB for the handover based on at least the second eNodeB capability of supported number of bearers and/or measurement report received from the UE, as an example, a second eNodeB 2 may be selected for the handover. The first eNodeB 1 may send to a first MME 1 a handover required message comprising one or more of the following parameters: direct forwarding path availability, source to target transparent container, target eNodeB Identity (e.g. second eNodeB 2 identity), CSG ID, CSG access mode, target TAI, and/or S1AP Cause; wherein direct forwarding path availability may indicate whether direct forwarding is available from the first eNodeB 1 to the second eNodeB 2.

In response to the message received from the first eNodeB 1, the first MME 1 may determine an MME relocation and may select a second MME 2 based on at least the second MME 2 capability of supported number of bearers. The first MME 1 may send to the second MME 2 a forward relocation request message comprising one or more of the following information: MME UE context, source to target transparent container, RAN cause, target eNodeB Identity, CSG ID, CSG membership indication, target TAI, MS Info change reporting action (if available), CSG information reporting action (if available), UE time zone, direct forwarding flag, serving network, and/or local home network id. In response to the message received from the first MME 1, the second MME 2 may determine an SGW relocation and may select a second SGW 2 based on at least the second SGW 2 capability of supported number of bearers. The second MME 2 may send to the second SGW 2 create session request message comprising one or more of the following information: bearer context(s) with PDN GW addresses and TEIDs (for GTP-based S5/S8) or GRE keys (for PMIP-based S5/S8) at the PDN GW(s) for uplink traffic, serving network, and/or UE time zone per PDN connection to the second SGW 2. The second SGW 2 may allocate the S-GW addresses and TEIDs for the uplink traffic on S1_U reference point (one TEID per bearer).

In response to the message received from the second MME 2, the second SGW 2 may send to the second MME 2 a create session response comprising one or more of the following information: Serving GW addresses and uplink TEID(s) for user plane. The second MME 2 may send to the second eNodeB 2 a handover request message comprising one or more of the following information: EPS bearers to setup, AMBR, S1AP cause, source to target transparent container, CSG ID, CSG membership indication, handover restriction list. For each EPS bearer, the EPS bearers to setup may comprise Serving GW address and uplink TEID for user plane, and EPS bearer QoS. In response to the message received from the second MME 2, the second eNodeB 2 may send to the second MME 2 a handover request acknowledge comprising one or more of the following information: EPS bearer setup list, EPS Bearers failed to setup list Target to Source transparent container. The EPS bearer setup list may include a list of addresses and TEIDs allocated at the second eNodeB 2 for downlink traffic on S1-U reference point (one TEID per bearer) and addresses and TEIDs for receiving forwarded data if necessary.

If indirect forwarding applies and the Serving GW is relocated, the second MME 2 may set up forwarding parameters by sending to the second SGW 2 a create indirect data forwarding tunnel request comprising second eNodeB 2 addresses and TEIDs for forwarding. In response to the message received from the second MME 2, the second SGW 2 may send to the second MME a create indirect data forwarding tunnel response message comprising target Serving GW addresses and TEIDs for forwarding. If the MME has been relocated, the second MME 2 may send to the first MME 1 a forward relocation response message comprising one or more of the following information: cause, target to source transparent container, Serving GW change indication, EPS bearer setup list, addresses and TEIDs). For indirect forwarding, this message may include Serving GW address and TEIDs for indirect forwarding (source or target). Serving GW change indication indicates a new Serving GW (e.g. SGW 2) has been selected. If indirect forwarding applies, the first MME 1 may send to the first SGW 1 a create indirect data forwarding tunnel request message comprising addresses and TEIDs for forwarding. If the Serving GW is relocated, the create an indirect data forwarding tunnel request message may include the tunnel identifier to the second SGW 2.

In response to the message received from the first MME 1, the first SGW 1 may send to the first MME 1 create indirect data forwarding tunnel response comprising Serving GW addresses and TEIDs for forwarding. In response to the message received from the first SGW 1, the first MME 1 may send to the first eNodeB 1 a handover command message comprising one or more of the following information: target to source transparent container, bearers subject to forwarding, bearers to release. The bearers subject to forwarding may comprise list of addresses and TEIDs allocated for forwarding. The bearers to release may comprise the list of bearers to be released. In response to the message received from the first MME 1, the eNodeB 1 may construct a handover command message by using the target to source transparent container, and the eNodeB 1 may send the message to the UE. Upon reception of this message, the UE may remove any EPS bearers for which it did not receive the corresponding EPS radio bearers in the target cell (e.g. in the second eNodeB 2).

In an example, an MME may receive from an SGW a first message indicating a request to create a bearer, wherein the first message may comprise at least one of: IMSI, EPS Bearer QoS of the bearer, TFT of the bearer, S1-TEID of the bearer and/or PDN GW TEID of the bearer (GTP-based S5/S8). The MME may determine that a number of bearers exceeds a configured supported number of bearers if the bearer is created. The MME may send to the SGW and in response to the determining, a response message comprising a cause information element indicating a failure of creating the bearer because of exceeding the supported number of bearers.

In an example, an MME may receive from an SGW a first message indicating a request to create a bearer, wherein the first message may comprise at least one of: IMSI, EPS Bearer QoS of the bearer, TFT of the bearer, S1-TEID of the bearer and/or PDN GW TEID of the bearer (GTP-based S5/S8). The MME may send to an eNB, a second message indicating a request to create the bearer. The MME may receive from the eNB, a response message to the second message, the response message indicating the bearer is rejected by the eNB because a number of bearers exceeds a configured supported number if the bearer is created. The MME may send to the SGW and in response to the determining, a response message comprising a cause information element indicating a failure of creating the bearer because of exceeding the supported number of bearers. In an example, the eNB may send to a wireless device, a third message comprising configuration parameters of the bearers (e.g. request creating a bearer), and the eNB may receive from the wireless device, a fourth message comprising at least one parameter indicating that the bearer is rejected.

In an example, an MME may receive from an SGW, a first message indicating a request to create a bearer, wherein the first message may comprise at least one of: IMSI, EPS Bearer QoS of the bearer, TFT of the bearer, S1-TEID of the bearer and/or PDN GW TEID of the bearer (GTP-based S5/S8). The MME may determine whether the bearer can be created with the EPS Bearer QoS of the bearer. The MME may send to the SGW and in response to the determining, a response message comprising a cause information element indicating a failure of creating the bearer because the EPS Bearer QoS of the bearer cannot be supported.

In an example, an MME may receive from an eNB, a first message comprising at least one eNB capability parameter indicating that the eNB supports up to a first number of bearers per wireless device. The MME may send to the eNB, a second message comprising at least one MME capability parameter indicating that the MME supports up to a second number of bearers per wireless device. The MME may receive from an SGW, a third message comprising at least: one SGW capability parameter indicating that the SGW supports up to a third number of bearers per wireless device, and/or one PGW capability parameter indicating that the PGW supports up to an eighth number of bearers per wireless device. The MME may send to the SGW, a fourth message comprising the at least one MME capability parameter indicating that the MME supports up to the second number of bearers per wireless device. The MME may determine that a network capability that a network supports up to a fourth number of bearers per wireless device, based on at least one or more of the following: the at least one eNB capability parameter; the at least one MME capability parameter; the at least one SGW capability parameter; the at least one PGW capability parameter; and/or the at least one SGW&PGW capability parameter. The MME may send to the SGW, a fifth message comprising the at least one network capability parameter indicating that the network supports up to the fourth number of bearers per wireless device.

In an example, an MME may receive from a wireless device and via an eNB, a sixth message comprising at least one wireless device capability parameter indicating that the wireless device supports up to a fifth number of bearers. The MME may determine a sixth number of bearers based on the fifth number of bearers and a fourth number of bearers supported by a network. The MME may send to an SGW, a seventh message comprising the sixth number bearers. In an example, the MME may receive from the SGW, a response message to the seventh message indicating that a session is successfully created. The MME may send to the wireless device and via the eNB, an eighth message indicating a request for initial context setup, wherein the eighth message may comprise the fourth number of bearers supported by the network if the fourth number is different from the fifth number. In an example, the sixth message may indicate a request to attach to the network. In an example, the seventh message may indicate a request to create a session. In an example, the second message may be transmitted in response to the first message. In an example, the sixth number may be equal to a smaller of the fourth number and the fifth number if the fourth number is different from the fifth number; and equal to the fourth number if the fourth number is equal to the fifth number.

In an example, the SGW may receive from a PGW, a ninth message comprising at least one PGW capability parameter indicating that the PGW supports up to an eighth number of bearers per wireless device. The SGW may determine, an SGW&PGW capability that a SGW&PGW supports up to a ninth number of bearers per wireless device, based on at least one or more of the following: the eighth number of bearers per wireless device; and an SGW number of bearers per wireless device.

In an example, a first eNB may send to a second eNB, a first message comprising at least one first eNB capability parameter indicating that the first eNB supports up to a first number of bearers per wireless device. The first eNB may receive from the second eNB, a second message comprising at least one second eNB capability parameter indicating that the second eNB supports up to a second number of bearers per wireless device. The first eNB may receive from a wireless device, a third message comprising at least one measurement report. The first eNB may determine a handover to a second eNB based on: the at least one measurement report; and/or the least one second eNB capability parameter. The first eNB may send to a first MME, a fourth message indicating a handover request. The first eNB may receive from the first MME a fifth message indicating acceptance of the handover request. The first eNB may send to the wireless device, a sixth message indicating a command to initiate a handover by the wireless device.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 13 is an example flow diagram as per an aspect of an embodiment of the present disclosure. At 1310, a first base station may receive a first message from at least one second base station. The first message may comprise capability information indicating a number of bearers supported by the at least one second base station. At 1320, the first base station may receive a measurement report from a wireless device, a measurement report comprising a received power of a cell of the second base station. At 1330, the first base station may determine a handover to the cell based on the measurement report and the number of bearers supported by the at least one second base station. At 1340, the first base station may send a handover request to the at least one second base station in response to the determining the handover.

Figure 14:
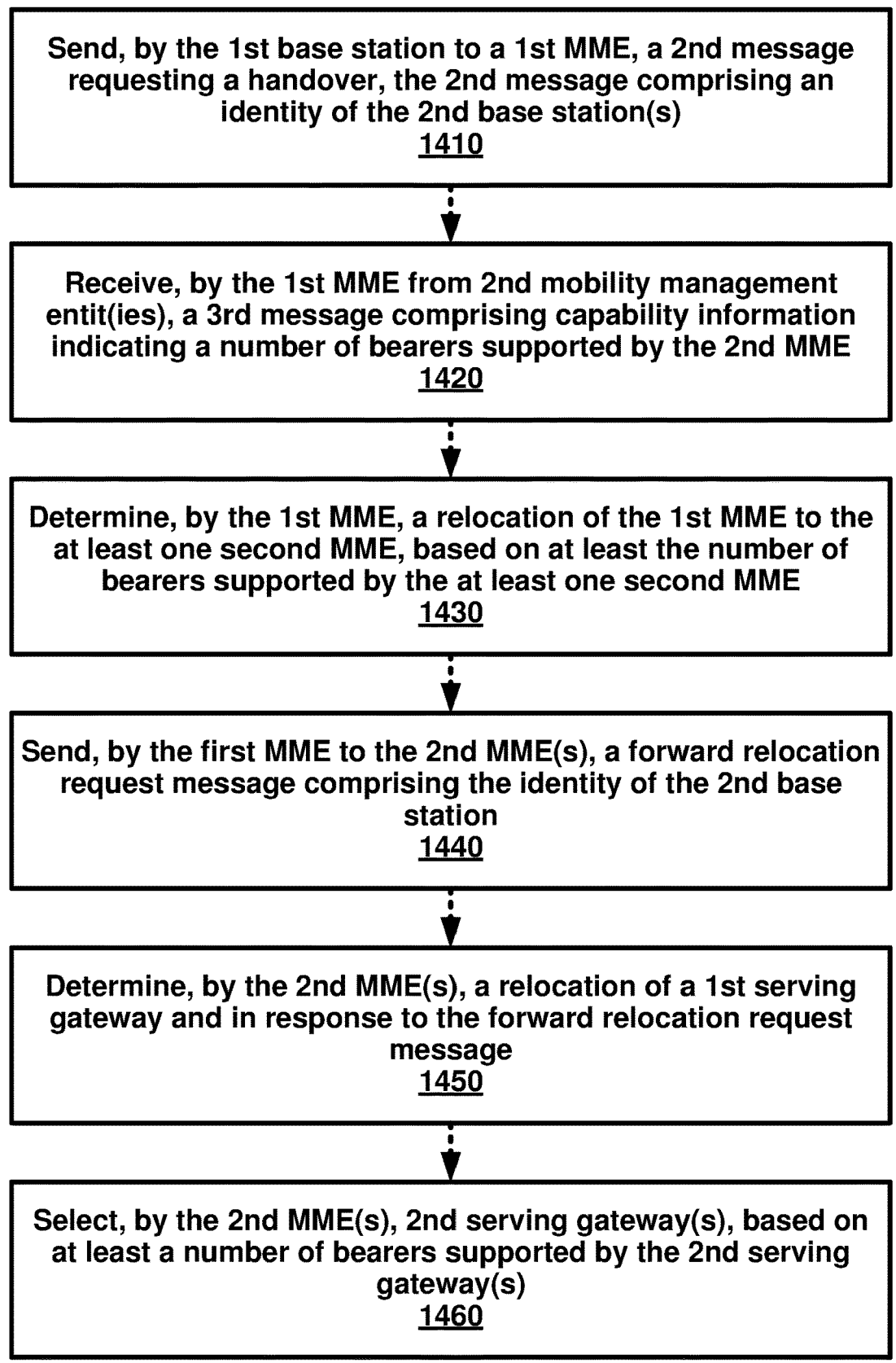
FIG. 14 is an example flow diagram of aspects of an embodiment of the present disclosure.

FIG. 14 is an example flow diagram as per an aspect of an embodiment of the present disclosure. At 1410, the first base station may send a second message to a first mobility management entity requesting a handover. The second message may comprise an identity of the at least one second base station. At 1420, the first mobility management entity may receive a third message from at least one second mobility management entity. The third message may comprise capability information indicating a number of bearers supported by the at least one second mobility management entity. At 1430, the first mobility management entity may determine a relocation of the first mobility management entity to the at least one second mobility management entity, based on at least the number of bearers supported by the at least one second mobility management entity. At 1440, the first mobility management entity may send a forward relocation request message to the at least one second mobility management entity. The forward relocation request message may comprise the identity of the at least one second base station. At 1450, the at least one second mobility management entity may determine, by a relocation of a first serving gateway in response to the forward relocation request message. At 1460, the at least one second mobility management entity may select at least one second serving gateway, based on at least a number of bearers supported by the at least one second serving gateway.

According to an example embodiment, the first mobility management entity may receive a fourth message from the at least one second serving gateway. The fourth message may comprise capability information indicating a number of bearers supported by the at least one second serving gateway. According to an example embodiment, the at least one second mobility management entity may send to the at least one second serving gateway, a create session request message requesting creation of a session. According to an example embodiment, the at least one second mobility management entity may receive a create session response message from the at least one second serving gateway in response to the create session request message. According to an example embodiment, the at least one second mobility management entity may send a handover request message to the at least one second base station. According to an example embodiment, the at least one second mobility management entity may receive a handover request acknowledge message from the at least one second base station in response to the handover request message. According to an example embodiment, the at least one second mobility management entity may send a forward relocation response to the first mobility management entity. According to an example embodiment, the first base station may receive a first handover command message from the first mobility management entity in response to the second message. According to an example embodiment, the first base station may send a second handover command message to the wireless device in response to the first handover command message. According to an example embodiment, the second message may be a handover required message. According to an example embodiment, the measurement report may comprise a block error rate. According to an example embodiment, the measurement report may comprise a transmit power. According to an example embodiment, the measurement report may comprise other UE-based parameters. According to an example embodiment, the first message may be an ENB CONFIGURATION UPDATE message.

Figure 15:
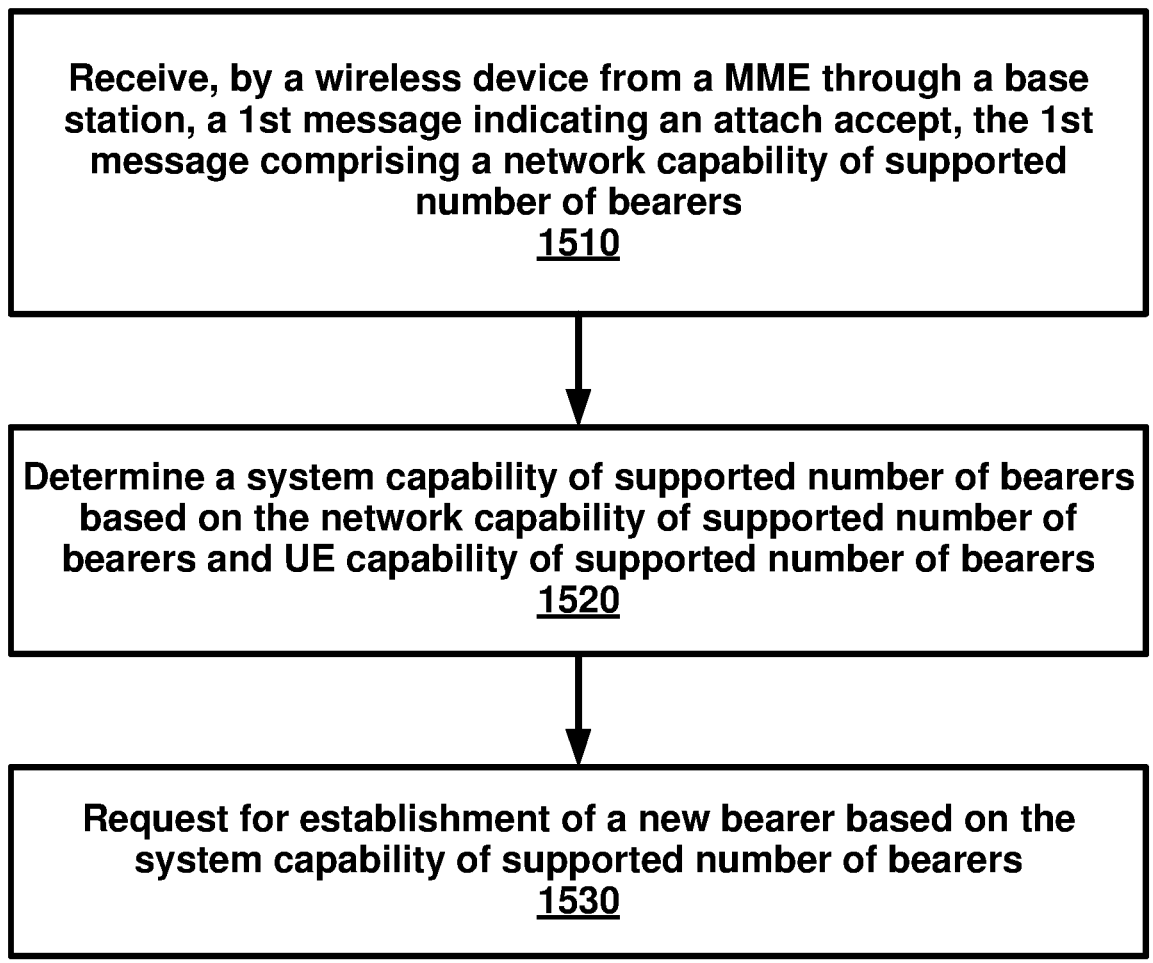
FIG. 15 is an example flow diagram of an aspect of an embodiment of the present disclosure.

FIG. 15 is an example flow diagram as per an aspect of an embodiment of the present disclosure. At 1510, a wireless device may receive a first message from a mobility management entity through a base station. The first message may indicate an attach accept. The first message may comprise a network capability of supported number of bearers. At 1520, the wireless device may determine a system capability of supported number of bearers based on the network capability of supported number of bearers and UE capability of supported number of bearers. At 1530, the wireless device may request for establishment of a new bearer based on the system capability of supported number of bearers.

FIG. 16 is an example flow diagram as per an aspect of an embodiment of the present disclosure. At 1610, a base station may receive a first message from a mobility management entity. The first message may request creation of a new bearer. The first message may comprise an EPS bearer identity. At 1620, the base station may determine, based on capability of supported number of bearers of the base station whether to accept or reject the request. At 1630, the base station may send a second message to the mobility management entity in response to the first message. The second message may comprise at least one information element indicating that the creating the new bearer failed because of exceeding supported number of bearers.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various Examples. If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}.

In this specification, various Examples are disclosed. Limitations, features, and/or elements from the disclosed example Examples may be combined to create further Examples within the scope of the disclosure.

In this specification, various Examples are disclosed. Limitations, features, and/or elements from the disclosed example Examples may be combined to create further Examples within the scope of the disclosure.

In this specification, parameters (Information elements: IEs) may comprise one or more objects, and one of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example, when one or more messages comprise a plurality of parameters, it implies that a parameter in the plurality of parameters is in at least one of the one or more messages, but does not have to be in one of the one or more messages.

Many of the elements described in the disclosed Examples may be implemented as modules. A module is defined here as an isolatable element that performs a defined function and has a defined interface to other elements. The modules described in this disclosure may be implemented in hardware, software in combination with hardware, firmware, wetware (e.g. hardware with a biological element) or a combination thereof, some of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various Examples have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative Examples. Thus, the present Examples should not be limited by any of the above described exemplary Examples. In particular, it should be noted that, for example purposes, the above explanation has focused on the example(s) using 5G AN. However, one skilled in the art will recognize that Examples of the invention may be implemented in a system comprising one or more legacy systems or LTE. The disclosed methods and systems may be implemented in wireless or wireline systems. The features of various Examples presented in this invention may be combined. One or many features (method or system) of one Example may be implemented in other Examples. A limited number of example combinations are shown to indicate to one skilled in the art the possibility of features that may be combined in various Examples to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some Examples.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a first base station from at least one second base station, a first message comprising a capability parameter indicating a maximum number of bearers per wireless device that can be supported by the at least one second base station;
   receiving, by the first base station from a first wireless device, a measurement report comprising a received power of a cell of the second base station;
   determining, by the first base station, a handover to the cell based on the measurement report and the maximum number of bearers per wireless device that can be supported by the at least one second base station; and
   sending, by the first base station to the at least one second base station, a handover request in response to the determining the handover.

2. The method of claim 1, further comprising sending, by the first base station to a first mobility management entity, a second message requesting a handover, the second message comprising an identity of the at least one second base station.

3. The method of claim 2, further comprising receiving, by the first mobility management entity from at least one second mobility management entity, a third message comprising a second capability parameter indicating a maximum number of bearers per wireless device that can be supported by the at least one second mobility management entity.

4. The method of claim 3, further comprising determining, by the first mobility management entity, a relocation of the first mobility management entity to the at least one second mobility management entity, based on at least the maximum number of bearers per wireless device that can be supported by the at least one second mobility management entity.

5. The method of claim 4, further comprising sending, by the first mobility management entity to the at least one second mobility management entity, a forward relocation request message comprising the identity of the at least one second base station.

6. The method of claim 5, further comprising determining, by the at least one second mobility management entity, a relocation of a first serving gateway and in response to the forward relocation request message.

7. The method of claim 6 further comprising selecting, by the at least one second mobility management entity, at least one second serving gateway, based on at least a maximum number of bearers per wireless device that can be supported by the at least one second serving gateway.

8. The method of claim 7, further comprising receiving, by the first mobility management entity from the at least one second serving gateway, a fourth message comprising a third capability parameter indicating a maximum number of bearers per wireless device that can be supported by the at least one second serving gateway.

9. The method of claim 8, further comprising sending, by the at least one second mobility management entity to the at least one second serving gateway, a create session request message requesting creation of a session.

10. The method of claim 9, further comprising receiving, by the at least one second mobility management entity from the at least one second serving gateway and in response to the create session request message, create session response message.

11. The method of claim 10, further comprising sending, by the at least one second mobility management entity to the at least one second base station, a handover request message.

12. The method of claim 11, further comprising receiving, by the at least one second mobility management entity from the at least one second base station and in response to the handover request message, a handover request acknowledge message.

13. The method of claim 12, further comprising sending, by the at least one second mobility management entity to the first mobility management entity, a forward relocation response.

14. The method of claim 2, further comprising receiving, by the first base station from the first mobility management entity and in response to the second message, a first handover command message.

15. The method of claim 14, further comprising sending, by the first base station to the first wireless device and in response to the first handover command message, a second handover command message.

16. The method of claim 2, wherein the second message is a handover required message.

17. The method of claim 1, wherein the measurement report comprises a block error rate.

18. The method of claim 1, wherein the measurement report comprises a transmit power.

19. The method of claim 1, wherein the measurement report comprises other UE-based parameters.

20. The method of claim 1, wherein the first message is an ENB CONFIGURATION UPDATE message.

* * * * *